US010740711B2

(12) United States Patent
Gray-Donald et al.

(10) Patent No.: US 10,740,711 B2
(45) Date of Patent: *Aug. 11, 2020

(54) OPTIMIZATION OF A WORKFLOW EMPLOYING SOFTWARE SERVICES

(71) Applicant: International Business Machines Corporation, Armonk, NY (US)

(72) Inventors: Trent A. Gray-Donald, Ottawa (CA); Simon Harris, Mount Martha (AU); Nisanth M. Simon, Westmead (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,577

(22) Filed: Oct. 31, 2018

(65) Prior Publication Data
US 2019/0066008 A1 Feb. 28, 2019

Related U.S. Application Data

(63) Continuation of application No. 15/478,530, filed on Apr. 4, 2017.

(51) Int. Cl.
*G06Q 10/06* (2012.01)
*G06F 9/50* (2006.01)
*H04L 29/08* (2006.01)

(52) U.S. Cl.
CPC ....... *G06Q 10/0633* (2013.01); *G06F 9/5005* (2013.01); *G06F 9/5038* (2013.01);
(Continued)

(58) Field of Classification Search
CPC .............................. H04L 67/10; H04L 67/16
See application file for complete search history.

(56) References Cited

U.S. PATENT DOCUMENTS 8,504,400 B2 * 8/2013 Purcell .................. G06F 9/5072
705/7.11
8,782,103 B2 * 7/2014 Ahlborn ............. G06Q 10/0633
707/812
(Continued)

OTHER PUBLICATIONS

A. Al Falasi and M. Adel Serhani, "A Framework for SLA-based cloud services verification and composition," 2011 International Conference on Innovations in Information Technology, Abu Dhabi, 2011, pp. 287-292. (Year: 2011).*
(Continued)

*Primary Examiner* — Mehmet Yesildag
*Assistant Examiner* — Francis Z. Santiago Merced
(74) *Attorney, Agent, or Firm* — Reza Sarbakhsh; Edell, Shapiro & Finnan, LLC

(57) ABSTRACT

According to an embodiment of the present invention, a system dynamically optimizes a service workflow including one or more software services. Initially, the system receives a request to optimize a service workflow, wherein the request includes one or more service requirements and one or more performance objectives related to the one or more service requirements. The system validates service plan information associated with at least one software service plan offered by one or more service providers and generates a plurality of candidate workflows based on the service requirements and performance objectives. The system then determines an optimized workflow from the candidate workflows and executes the optimized workflow to perform operations of the software services. Embodiments of the present invention further include a method and computer program product for dynamically optimizing a service workflow including one or more software services in substantially the same manner as described above.

12 Claims, 17 Drawing Sheets

(52) U.S. Cl.
CPC ............ G06F 9/5083 (2013.01); H04L 67/28 (2013.01); *G06F 9/5088* (2013.01); *H04L 67/10* (2013.01); H04L 67/1008 (2013.01); *H04L 67/16* (2013.01)

(56) References Cited

U.S. PATENT DOCUMENTS

| | | | | |
|---|---|---|---|---|
| 10,250,451 | B1* | 4/2019 | Moghe | H04L 41/145 |
| 2006/0229924 | A1* | 10/2006 | Aron | G06Q 10/06316 |
| | | | | 705/7.26 |
| 2011/0213686 | A1 | 9/2011 | Ferris et al. | |
| 2011/0238458 | A1* | 9/2011 | Purcell | G06F 9/5072 |
| | | | | 705/7.27 |
| 2011/0320233 | A1* | 12/2011 | Arnette | G06F 9/4881 |
| | | | | 705/7.15 |
| 2013/0117157 | A1 | 5/2013 | Iyoob et al. | |
| 2013/0218618 | A1* | 8/2013 | Purcell | G06F 9/5072 |
| | | | | 705/7.13 |
| 2013/0275475 | A1* | 10/2013 | Ahlborn | G06Q 10/0633 |
| | | | | 707/812 |
| 2014/0164048 | A1* | 6/2014 | Bourdaillet | G06Q 10/0633 |
| | | | | 705/7.27 |
| 2014/0229607 | A1 | 8/2014 | Jung et al. | |
| 2014/0278807 | A1* | 9/2014 | Bohacek | G06Q 30/0206 |
| | | | | 705/7.35 |
| 2014/0278808 | A1* | 9/2014 | Iyoob | G06Q 30/0206 |
| | | | | 705/7.35 |
| 2015/0227268 | A1* | 8/2015 | Rathod | G06Q 10/00 |
| | | | | 715/739 |
| 2015/0268935 | A1 | 9/2015 | Muntes et al. | |
| 2015/0370467 | A1* | 12/2015 | Holmes-Higgin | G06F 3/0481 |
| | | | | 715/738 |
| 2016/0094483 | A1* | 3/2016 | Johnston | H04L 47/827 |
| | | | | 709/226 |
| 2016/0134558 | A1 | 5/2016 | Steinder et al. | |

OTHER PUBLICATIONS

Y. Zhang, B. Zhang, C. Zhang and J. Wu, "A Composite Service Selection Method Supporting Service-Sharing across Multi-SLAs," 2015 IEEE World Congress on Services, New York, NY, 2015, pp. 357-364. (Year: 2015).*

Zhang et al., "A Cloud Infrastructure Service Recommendation System for Optimizing Real-time QoS Provisioning Constraints", IEEE Systems Journal, 2014, 12 pages.

"IBM Cloud Brokerage Solutions", http://www-935.ibm.com/services/us/en/it-services/systems/cloud-brokerage-service/ , retrieved from internet Mar. 2017, 3 pages.

List of IBM Patents or Patent Application Treated as Related, Oct. 2018, 1 page.

* cited by examiner

FIG.8

| CATALOGUE_ID | CATALOG_NAME | CATALOGUE_TYPE | DESCRIPTION |
|---|---|---|---|
| 1 | TWITTER | DATA | GET TWEETS |
| 2 | DETECT FACE | API | DETECT FACE |
| 3 | SENTIMENT ANALYSIS | API | ANALYZE SENTIMENT |
| 4 | FACEBOOK | DATA | GET FACEBOOK DATA |

| SERVICE ID | CATALOGUE ID | SERVICE NAME | REGION | SERVICE URL | API LICENSE KEY | OAUTH KEY DETAILS | CONNECTOR JAR | PRIORITY |
|---|---|---|---|---|---|---|---|---|

| FACE DETECTION SERVICE | | |
|---|---|---|
| 0-1000 REQUEST PER MONTH | 1001-1 MILLION REQUEST PER MONTH | 1 MILLION AND 1-5 MILLION REQUEST PER MONTH |
| FREE | 1.5$/1000 REQUEST | 1.3$/1000 REQUEST |

1000

OPTIMIZATION OF A WORKFLOW EMPLOYING SOFTWARE SERVICES

CROSS-REFERENCE TO RELATED APPLICATIONS

This application is a continuation of U.S. patent application Ser. No. 15/478,530, entitled "OPTIMIZATION OF A WORKFLOW EMPLOYING SOFTWARE SERVICES" and filed Apr. 4, 2017, the disclosure of which is incorporated herein by reference in its entirety.

BACKGROUND

1. Technical Field

Present invention embodiments relate to optimizing software services, and more specifically, to dynamically determining an optimum workflow schedule of cloud-based software services based on user requirements and service provider data.

2. Discussion of the Related Art

As the use of computers in both the workforce and personal life has increased, so too has the number of cloud-based Application Programming Interfaces (APIs) or software services that clients may use. Accordingly, many companies offer different API's or software services as part of their cloud strategies, such as image recognition, image detection, language translation, sentiment analysis, language analysis, speech analysis and recognition, etc. As a result of competition, a consumer who wishes to consume these services can get the same technology or service from multiple providers. Typically, service providers charge rates based on their consumers' usage of their cloud-based APIs and services. However, some service providers will offer free service up to a maximum limit, after which consumers must enroll in monthly plans based on their usage. Furthermore, some service providers offer discounted rates to consumers who use a bundle of their APIs and/or services. Consequently, it is often difficult for clients to determine the optimum selection of service providers, and associated service plans, that satisfy their processing requirements and minimize their costs.

SUMMARY

According to an embodiment of the present invention, a system dynamically optimizes a service workflow including one or more software services. Initially, the system receives a request to optimize a service workflow, wherein the request includes one or more service requirements and one or more performance objectives related to the one or more service requirements. The system validates service plan information associated with multiple software service plans offered by a plurality of service providers and generates a plurality of candidate workflows based on the service requirements and performance objectives. Each candidate workflow includes one or more software services with validated service plan information. The system then determines an optimized workflow from the candidate workflows, based on a cost of the one or more software services within the candidate workflows, and executes the optimized workflow to perform operations of the software services. Embodiments of the present invention further include a method and computer program product for dynamically optimizing a service workflow including one or more software services in substantially the same manner as described above.

According to a further embodiment of the present invention, the system may further reduce a minimum cost prediction of a software service by selecting a first service provider to provide a first portion of the software service and at least a second service provider to provide at least a second portion of the software service.

According to yet another embodiment of the present invention, the system may further determine a quota associated with a user for the software service for each of the one or more service providers and a total quota amount for the user by aggregating the quota associated with each of the one or more service providers. The system may then validate the request to optimize the workflow in response to an amount of software service requested by the user being less than or equal to the total quota amount for the user.

BRIEF DESCRIPTION OF THE DRAWINGS

FIG. 8 is an illustration of an example catalogue table, according to an embodiment of the present invention.

FIG. 9 is an illustration of an example service table, according to an embodiment of the present invention.

FIG. 10 is an illustration of an example service table including multiple service plans, according to an embodiment of the present invention.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Figure 1:
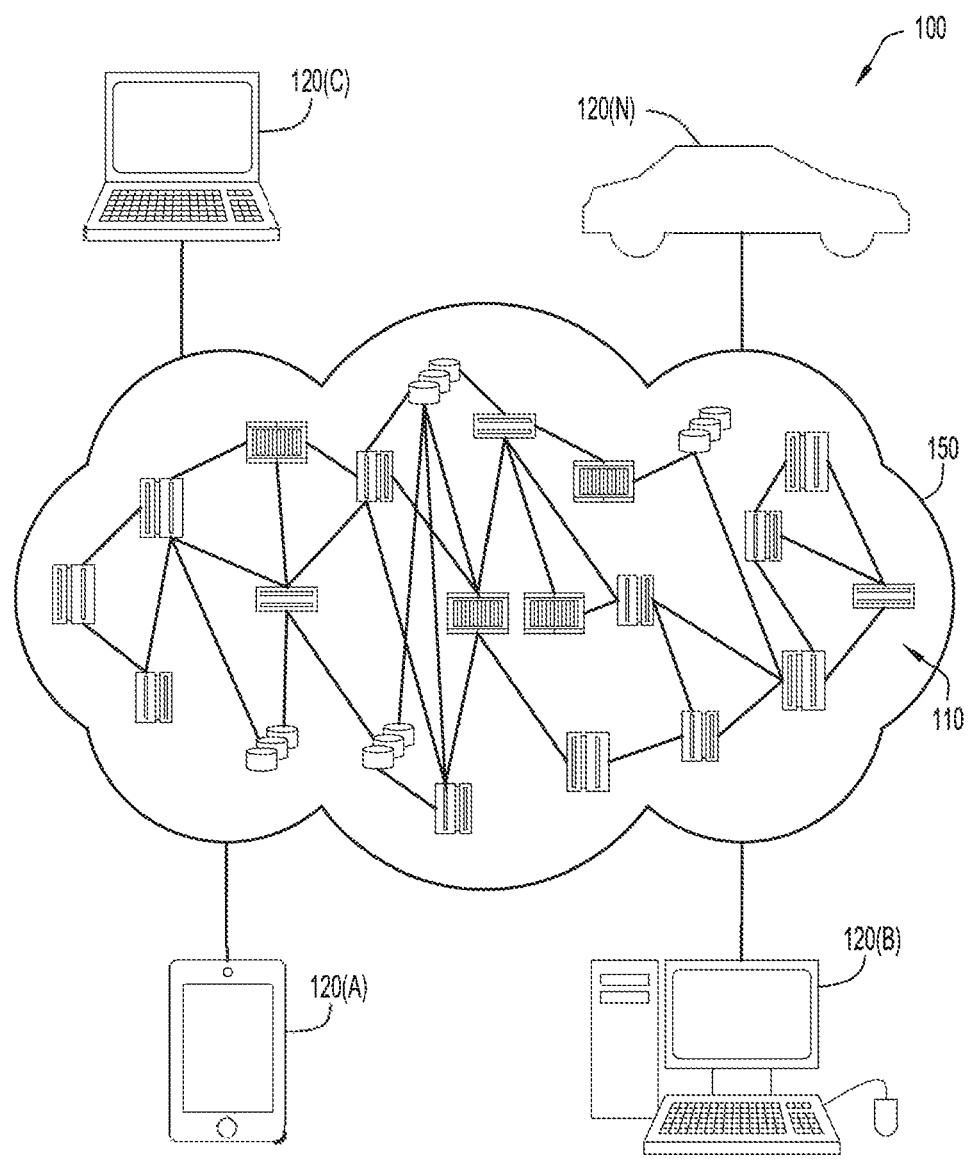
FIG. 1 is a schematic diagram of a cloud computing environment in which present invention embodiments may be implemented.

Referring now to FIG. 1, illustrative cloud computing environment 150 of system 100 is depicted. As shown, cloud computing environment 150 includes one or more cloud computing nodes 110 with which local computing devices used by cloud consumers, such as, for example, personal digital assistant (PDA) or cellular telephone 120A, desktop computer 120(B), laptop computer 120(C), and/or automobile computer system 120(N) may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of client devices 120A-N shown in FIG. 1 are intended to be illustrative only and that computing nodes 110 and cloud computing environment 150 can communicate with any type of computerized device over any type of network and/or network addressable connection (e.g., using a web browser). It should be further understood that the terms client and user may be used interchangeably.

Figure 2:
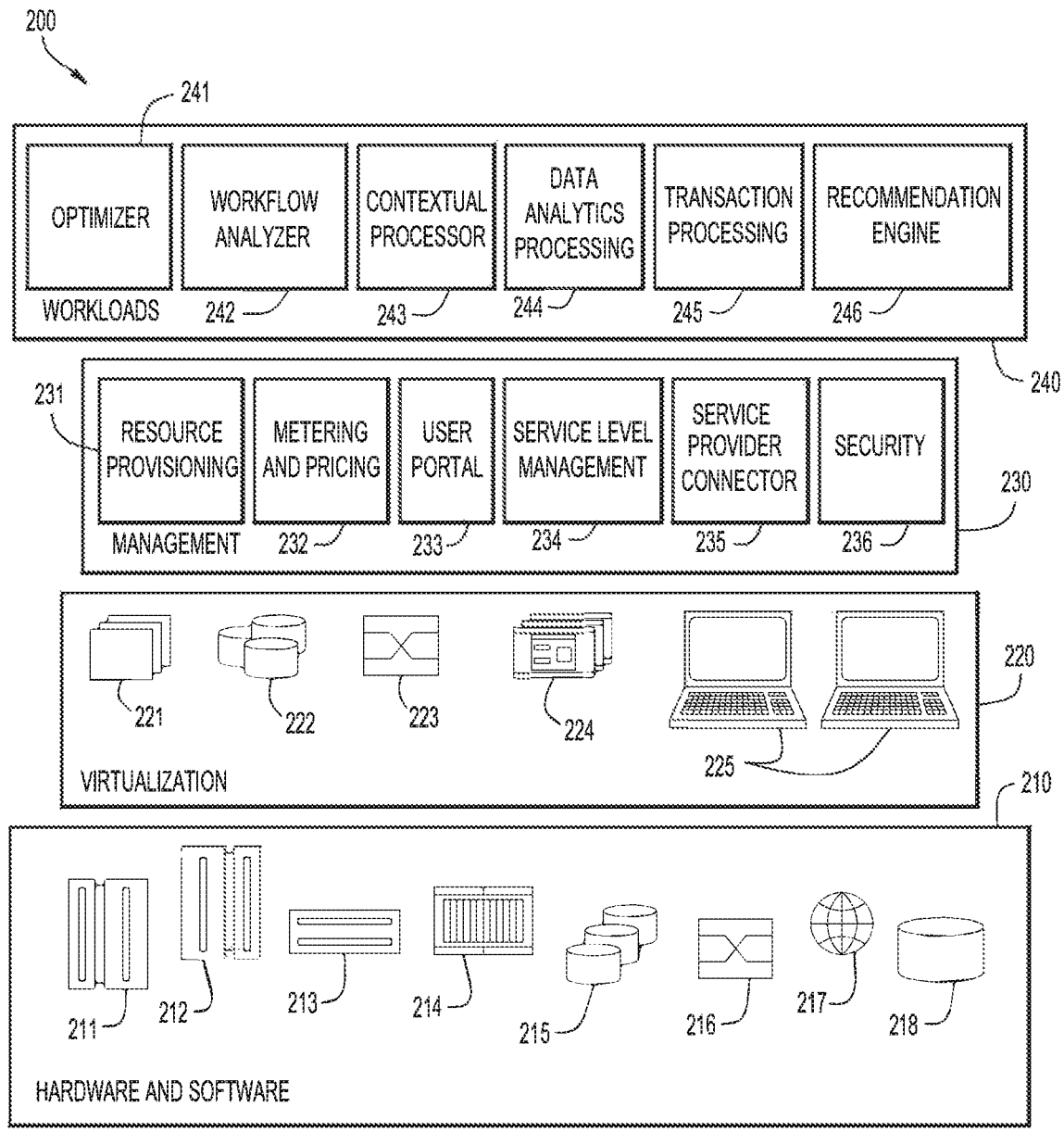
FIG. 2 is a diagram of abstraction model layers of a cloud computing environment in which present invention embodiments may be implemented.

Referring now to FIG. 2, a set of functional abstraction layers 200 provided by cloud computing environment 150 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 210 includes hardware and software components. Examples of hardware components include: mainframes 211; RISC (Reduced Instruction Set Computer) architecture based servers 212; servers 213; blade servers 214; storage devices 215; and networks and networking components 216. In some embodiments, software components include network application server software 217 and database software 218.

Virtualization layer 220 provides an abstraction layer from which the following examples of virtual entities may be provided: virtual servers 221; virtual storage 222; virtual networks 223, including virtual private networks; virtual applications and operating systems 224; and virtual clients 225.

In one example, management layer 230 may provide the functions described below. Resource provisioning 231 provides dynamic procurement of computing resources and other resources that are utilized to perform tasks within the cloud computing environment. Metering and Pricing 232 provide cost tracking as resources are utilized within the cloud computing environment, and billing or invoicing for consumption of these resources. In one example, these resources may include application software licenses. Security 236 provides identity verification for cloud consumers and tasks, as well as protection for data and other resources. User portal 233 provides access to the cloud computing environment for consumers and system administrators. Service level management 234 provides cloud computing resource allocation and management such that required service levels are met. Service Provider Connector 235 provides a connection to one or more cloud-based service providers to receive service plan information associated with the one or more cloud-based service providers.

Workloads layer 240 provides examples of functionality for which the cloud computing environment may be utilized. Examples of workloads and functions which may be provided from this layer include: optimizer 241; workflow analyzer 242; contextual processor 243; data analytics processing 244; transaction processing 245; and recommendation engine 246.

Figure 3:
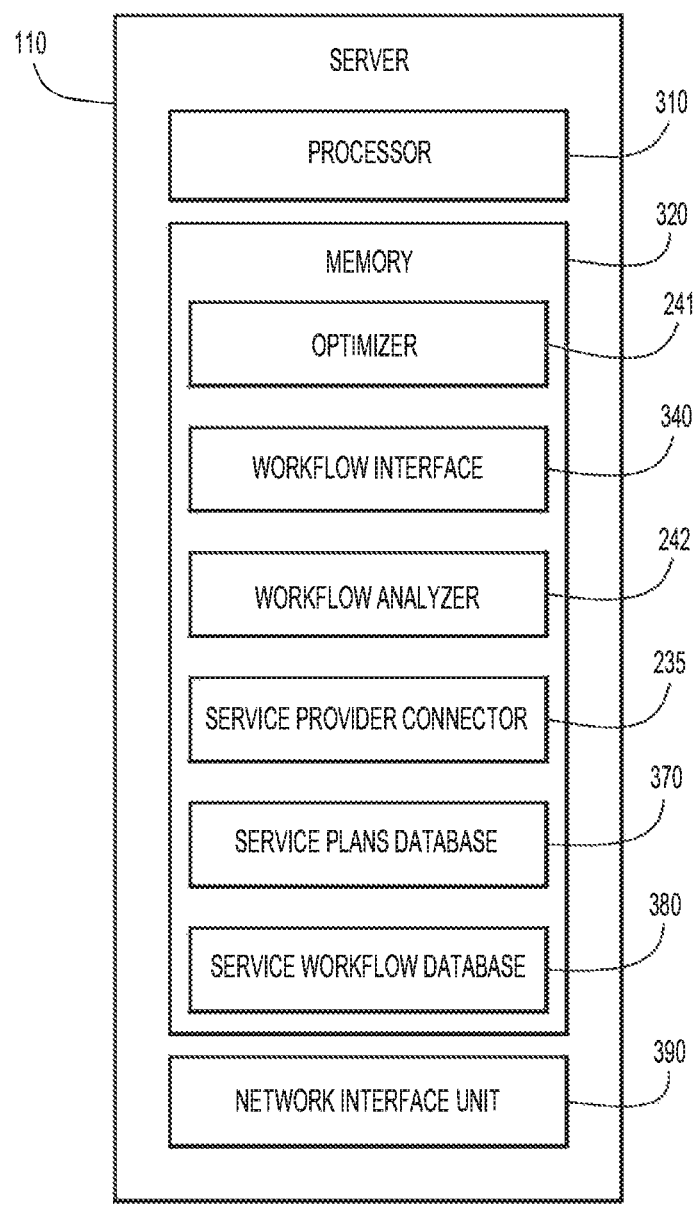
FIG. 3 is a block diagram illustrating the cloud-based server of FIG. 1 in more detail according to an embodiment of the present invention.

Reference is now made to FIG. 3, which shows an example block diagram of a server 110 of FIG. 1 configured to dynamically optimize a service workflow according to present invention embodiments. It should be understood that there are numerous possible configurations for server 110 and FIG. 3 is meant to be an example of one of the possible configurations. Server 110 includes a processor 310, memory 320 and a network interface unit 390. The network interface (I/F) unit (NIU) 390 is, for example, an Ethernet card or other interface device that allows server 110 to communicate with cloud computing environment 150. Network I/F unit 390 may include wired and/or wireless connection capabilities.

Processor 310 may include a collection of microcontrollers and/or microprocessors, for example, each configured to execute respective software instructions stored in the memory 320. Memory 320 may include various modules for execution by processor 310, including optimizer 241, service provider connector 235, workflow analyzer 242, contextual processor 243, DNA analytics processing 244, transaction processing 245, recommendation engine 246, workflow interface 340, service plan database 370, and service workflow database 380. Portions of memory 320 (and the instructions or modules therein) may be integrated with processor 310.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 320 may comprise one or more computer readable storage media (e.g., a memory device) encoded with software comprising computer executable instructions and when the software is executed (e.g., by processor 310) it is operable to perform the operations described herein. For example, memory 320 stores or is encoded with instructions for optimizer 241 to perform overall control of the optimizing operations of service workflows described herein by receiving one or more inputs from multiple components, including workflow interface 340, workflow analyzer 242, service provider connector 235, service plan database 370 and service workflow database 380. Optimizer 241 is further configured to send one or more optimized service workflows for display on client device 120(N). According to a present invention embodiment, optimizer 241 may be further configured to provide one or more recommendations to a client associated with client device 120 based on one or more service parameters and/or requirements received from client device 120.

Workflow interface 340 is configured to allow a client to submit a request to optimize one or more service workflows including one or more software services. Accordingly, workflow interface 340 allows a client to define one or more software services associated with each of the one or more service workflows that the client would like to optimize and execute. It should be understood that workflow interface 340 may use any input device, application programming interface (API) and/or graphical user interface (GUI) to receive a request to optimize one or more service workflows from a client associated with client device 120(N).

Workflow analyzer 242 is configured to detect and/or identify one or more contextual vocabulary parameters associated with one or more software services included in each of the one or more service workflows. Workflow analyzer 242 may also determine whether one or more of the identified vocabulary parameters corresponds to one or more services associated with one or more service providers. For example, workflow analyzer 242 may analyze a service workflow to determine that a service workflow comprises a software service request to perform sentiment analysis on a large dataset.

Service provider connector 235 is configured to allow server 110 to submit one or more requests for service plan information to one or more service providers. Accordingly, service provider connector 235 allows server 110 to retrieve cost and rate information of one or more software services in a requested service workflow that are offered by one or more service providers in order to optimize and execute the optimized service workflow. According to a present invention embodiment, service provider connector 235 may send one or more requests for service plan information to one or more service providers at predefined intervals, e.g., monthly, and/or in response to receiving a request to optimize one or more service workflows. It should be understood that workflow interface 340 may use any input device, API and/or GUI to receive the service plan information from the one or more service providers.

Optimizer 241, workflow interface 340, workflow analyzer 242 and service provider connector 235 may include one or more modules or units to perform the various functions of present invention embodiments described below. The various modules (e.g., optimizer 241, workflow interface 340, workflow analyzer 242, service provider connector 360, etc.) may be implemented by any combination of any quantity of software and/or hardware modules or units, and may reside within memory 320 of server 110 for execution by processor 310.

Memory 320 may further provide service plans database 370 which stores various information associated with one or more service plans offered by one or more service providers. For example, service plans database 370 may store the names of one or more service providers associated with one or more software service plans, as well as rate, cost, and expiration information associated with the one or more service software service plans.

Memory 320 may still further provide service workflow database 380, which stores various information associated with one or more service workflows received from one or more client devices 120(N). For example, service workflow database 380 may store one or more client service parameters and/or requirements associated with one or more services included in one or more requests to optimize and execute one or more service workflows. Service plans database 370 and service workflow database 380 may be implemented by any conventional or other database or storage unit, may be local to or remote from backend server 130, and may communicate via any appropriate communication medium (e.g., local area network (LAN), wide area network (WAN), Internet, hardwire, wireless link, Intranet, etc.).

Figure 4:
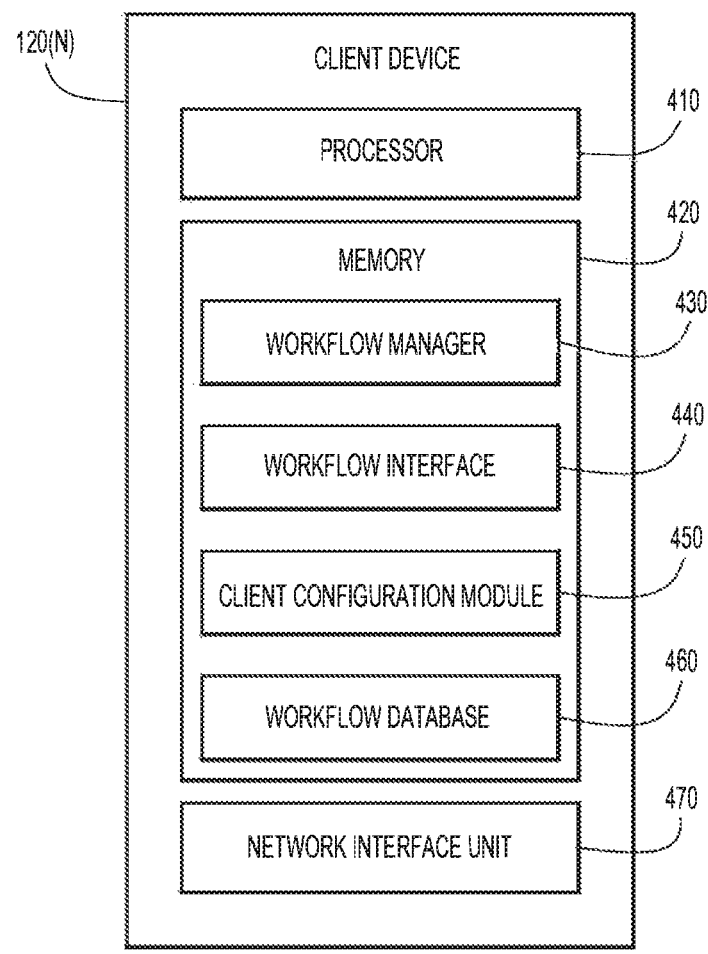
FIG. 4 is a block diagram illustrating the client device of FIG. 1 in more detail according to an embodiment of the present invention.

Reference is now made to FIG. 4, which shows an example block diagram of a client device 120(N) configured to request the optimization of one or more service workflows. It should be understood that there are numerous possible configurations for client device 120(N) and FIG. 4 is meant to be an example of one of the possible configurations. Client device 120(N) includes a processor 410, memory 420 and a network interface unit 470. The network interface (I/F) unit (NIU) 470 is, for example, an Ethernet card or other interface device that allows client device 120(N) to communicate with cloud computing environment 150. Network I/F unit 470 may include wired and/or wireless connection capabilities.

Processor 410 may include a collection of microcontrollers and/or microprocessors, for example, each configured to execute respective software instructions stored in the memory 420. Memory 420 may include various modules for execution by processor 410, including workflow manager 430, workflow interface 440, client configuration module 450, and workflow database 460. Portions of memory 420 (and the instructions or modules therein) may be integrated with processor 410.

Memory 420 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 420 may comprise one or more computer readable storage media (e.g., a memory device) encoded with software comprising computer executable instructions and when the software is executed (e.g., by processor 410) it is operable to perform the operations described herein. For example, memory 420 stores or is encoded with instructions for workflow manager 430 to perform overall control of the operations to request the optimization and execution of one or more service workflows described herein by receiving one or more inputs from multiple components, including workflow interface 440, client configuration module 450, and workflow database 460. Workflow manager 430 is further configured to send one or more client configuration parameters and/or requirements associated with one or more software services included in one or more service workflows to server 110 to determine, based on the received client configuration parameters and/or requirements, an optimized selection of one or more service providers to execute the one or more software services included in the one or more service workflows.

Client configuration module 450 is configured to allow a client associated with client device 120 to set one or more service parameters and/or client requirements associated with one or more software services and included in one or more service workflows. Accordingly, client configuration module 450 allows a client to request one or more software services as well as to define minimum levels of one or more quality of service (QOS) parameters associated with the software services and a time period during which the one or more services must be executed. For example, a client, using workflow interface 440 associated with client configuration module 450, may create a request for a service workflow that includes sentiment analyzer services and contextual analyzer services and may define the reliability and average processing time for the requested services. It should be understood that client configuration module 450 may use any input device and/or graphical user interface (GUI) to receive one or more software service parameters and/or user requirements from a client associated with client device 120(N).

Memory 420 may further provide workflow database 460, which stores various information used and generated by workflow manager 430 for requesting the optimization of one or more service workflows from server 110. For example, workflow database 460 may store one or more service parameters and/or user requirements requested by a client associated with client device 120(N) and received by client configuration module 450. Workflow database 460 may be implemented by any conventional or other database or storage unit, may be local to or remote from server 110, and may communicate via any appropriate communication medium (e.g., local area network (LAN), wide area network (WAN), Internet, hardwire, wireless link, Intranet, etc.).

Figure 5:
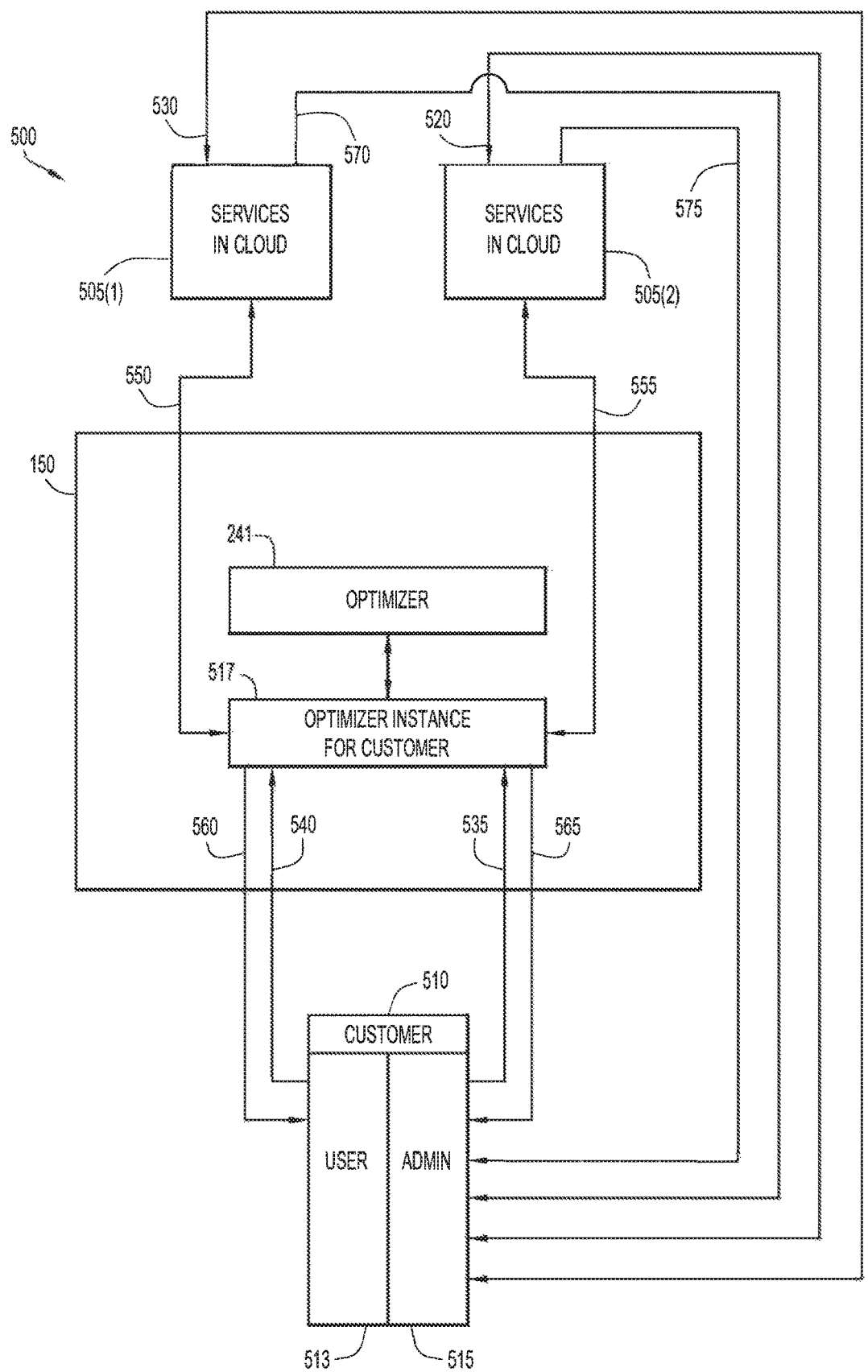
FIG. 5 is an illustration of a manner in which cloud-based service providers are dynamically selected to optimize a workflow in the cloud computing environment of FIG. 1 according to an embodiment of the present invention.

Reference is now made to FIG. 5, which shows an illustration of a process 500 in which cloud-based service providers are dynamically selected to optimize a workflow according to an embodiment of the present invention. As shown in FIG. 5, an environment for process 500 comprises cloud computing environment 150, client 510 and service providers 505(1) and 505(2). As is further shown in FIG. 5, cloud computing services 150 may host optimizer 241 and client optimizer instance 517, and client 510 may comprise one or more users 513 and administrator 515. For example, administrator 515 may be responsible for negotiating agreements with one or more service providers, e.g., 505(1) and 505(2), as well as registering one or more service workflows and/or catalogues in cloud computing environment 150, enabling users 513 to optimize one or more service workflows in cloud computing environment 150. Accordingly, users 513 may create one or more service workflows or service queries and execute them in cloud computing services 150. As further shown in FIG. 5, Client 510 may be associated with client optimizer instance 517 hosted in cloud computing environment 150.

Initially, client 510 may enter into a pre-arranged agreement with each of the service providers, e.g., 505(1) and 505(2), to use software services hosted on the cloud environments associated with each of the service providers, e.g., 505(1) and 505(2). In response to the pre-arranged agreement between client 510 and each of the service providers, e.g., 505(1) and 505(2), administrator 515 may send a first request to service provider 505(1) for license key and/or OauthKey information to enable one or more users 513 to use one or more software services hosted by service provider 505(1) at step 520. Similarly, administrator 515 may send a second request to service provider 505(2) for license key and/or OauthKey information to enable one or more users 513 to use one or more software services hosted by service provider 505(2) at step 530.

After sending the first and second request, administrator 515 may configure the software services hosted by each of the service providers, e.g., 505(1) and 505(2), in client optimizer instance 517, enabling one or more users 513 to optimize a use case comprising one or more user service workflows, at step 535. According to an embodiment of the present invention, configuring the software services may include registering catalogue and/or service plan information associated with each of the service providers, e.g., 505(1) and 505(2), in client optimizer instance 517.

The one or more users 513 may then upload one or more use cases comprising one or more service workflows to client optimizer instance 517 to request optimization of the one or more user service workflows at step 540. According to an embodiment of the present invention, the one or more users 513 may use workflow interface 440 to upload one or more use cases comprising one or more service workflows to client optimizer instance 517.

In response to receiving the one or more use cases, client optimizer instance 517 may generate an optimized service workflow for each of the one or more use cases and may connect with service provider 505(1) at step 550, and with service provider 505(2), at step 555, to request service plan information related to the one or more optimized service workflows to estimate the expected costs associated with each of the one or more optimized service workflows.

Client optimizer instance 517 may calculate the expected costs of executing the one or more optimized service workflows over the preconfigured interval and forward the expected costs to the one or more users 513 at step 560 and to administrator 515 at step 565. According to an embodiment of the present invention, the preconfigured interval may be monthly and client optimizer instance 517 may send the expected costs of executing the one or more optimized service workflows to users 513 and administrator 515 at the end of each calendar month.

Service provider 505(1) may send the actual costs of executing the one or more services on its cloud environment over the pre-configured interval to administrator 515 at step 570. Similarly, service provider 505(2) may send the actual costs of executing the one or more services on its cloud environment over the pre-configured interval to administrator 515 at step 575, and process 500 ends. According to an embodiment of the present invention, administrator 515 may compare the expected costs received from client optimizer instance 517 with the actual costs received from each of the service providers, e.g., 505(1) and 505(2), to determine whether any billing discrepancies have occurred.

According to another embodiment of the present invention, client optimizer instance 517 may automatically connect with service provider 505(1) and/or service provider 505(2) to execute an optimized service workflow for each of the one or more use cases.

Figure 6:
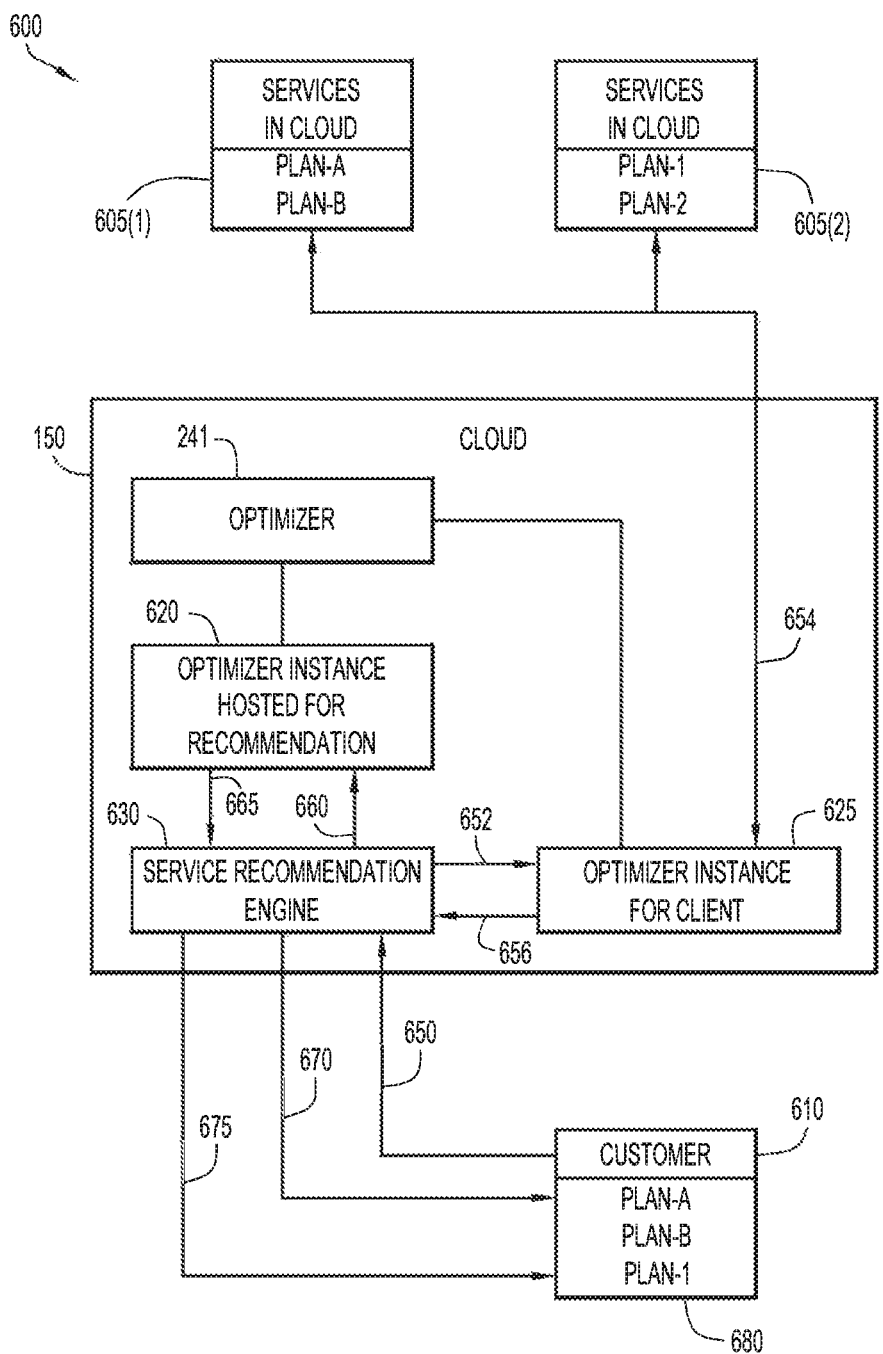
FIG. 6 is an illustration of a flow diagram of another manner in which cloud-based service plans are dynamically selected and recommended to optimize a workflow according to an embodiment of the present invention.

Reference is now made to FIG. 6, which shows an illustration of a process 600 in which cloud-based service providers are analyzed and a recommendation of one or more service plans is dynamically presented to optimize client costs according to an embodiment of the present invention. As shown in FIG. 6, an environment for process 600 comprises cloud computing environment 150, client 610 and service providers 605(1) and 605(2). As is further shown in FIG. 6, cloud computing environment 150 may host optimizer 241, optimizer instance 620, client optimizer 625, and instance service recommendation engine 630. As is further shown in FIG. 6, client 610 is currently using multiple service plans hosted by service provider 605(1), e.g., Plan_A and Plan_B, and a service plan hosted by service provider 605(2), e.g., Plan_1.

Initially, client 610 may send a request to service recommendation engine 630 to recommend one or more service plans offered by one or more service providers, e.g., 605(1) and 605(2), based on the software services used by client 610 over a previous interval period, e.g., the past month, at step 650.

In response to receiving the recommendation request from client 610, service recommendation engine 630 may send a request to client optimizer instance 625 to get service workflow information associated the software services used by client 610 over the previous interval period, e.g., the past month, at step 652. Client optimizer instance 625 may then send a request to one or more service providers, e.g., 605(1) and 605(2), for the workflow information associated the software services used by client 610 at step 654, and may forward the workflow information to service recommendation engine 630 at step 656.

After receiving the service workflow information, service recommendation engine 630 may forward the service workflow information to optimizer instance 620 to estimate the costs associated with one or more service workflows over an interval period, e.g., one month, at step 660.

Optimizer instance 620 may simulate the one or more service workflows to estimate their associated costs and forward the estimated costs for the one or more service workflows to service recommendation engine 630 for analysis at step 665.

Service recommendation engine 630 may compare the estimated costs associated with the one or more service workflows over an interval period, e.g., one month, across each service provider, e.g., 605(1) and 605(2), to determine one or more service plan recommendations that reduce the estimated costs associated with the one or more service workflows, and sends a complete report, including the one or more service plan recommendations, to client 610 at step 670. According to an embodiment of the present invention, the complete report may further include the estimated costs savings associated with each of the one or more service plan recommendations. For example, the complete report may recommend that client 610 switch from currently using one or more service plans, e.g., Plan_A, Plan_B and/or Plan_1, to using software services hosted on cloud computing services 150 to reduce client costs, e.g., $700 per month.

Service recommendation engine 630 further sends the actual costs of providing the one or more service plan recommendations to client 610 at step 675.

Based on the one or more service plan recommendations, client 610 may select one or more of the service plans included in the service plan recommendations and enter into a service agreement to reduce the costs associated with the one or more service workflows at step 680 and process 600 ends.

Figure 7:
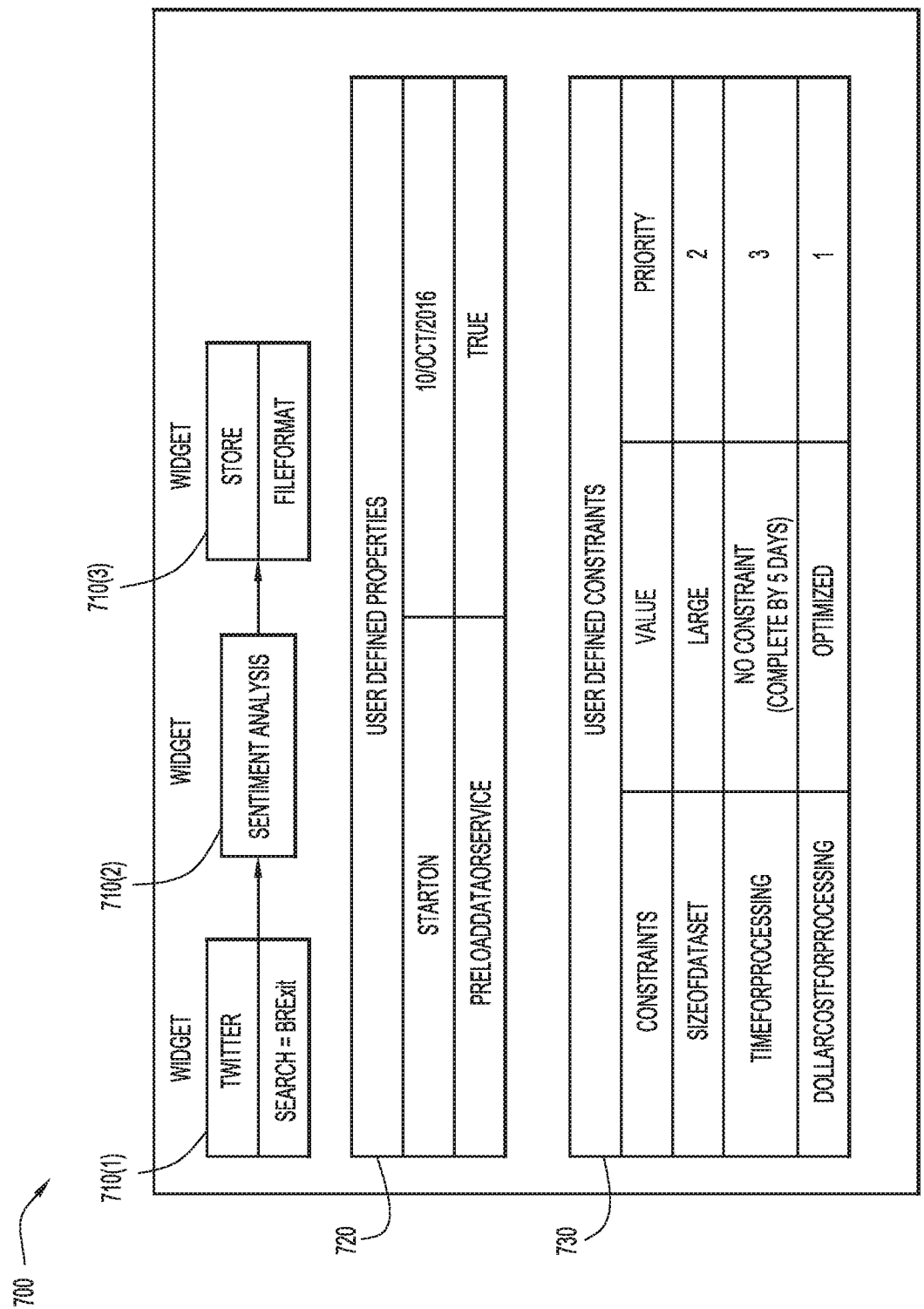
FIG. 7 is an illustration of an example service workflow, according to an embodiment of the present invention.

A diagrammatic illustration of an example service workflow 700 according to an embodiment of the present invention is illustrated in FIG. 7. By way of example, service workflow 700 may include one or more software services identified by one or more widgets, e.g., 710(1), 710(2) and 710(3). For example, widget 710(1) may include a request for software services to search stored Twitter feeds to determine instances of the term "BRExit" within the stored Twitter feeds. Similarly, widget 710(2) may include a request for software services to perform a sentiment analysis on the Twitter feeds and widget 710(3) may include a request to store the results of the sentiment analysis in a pre-selected file format.

Service workflow 700 may further include properties table 720 comprising client-selected requirements and/or preferences associated with the one or more services included in service workflow 700. For example, properties table 720 may include a StartOn record defining the date on which the one or more services identified by widgets 710(1)-710(3) should be executed. Properties table 720 may further include a PreloadDataOrService flag indicating whether the data processed by the one or more services should be preloaded or loaded in real-time, depending on the client-defined opportunity cost constraint.

Service workflow 700 may also include constraints table 730, which identifies one or more client-defined constraints associated with the one or more software services included in service workflow 700. According to an embodiment, client-defined constraints may include: time for processing, size of dataset and dollar cost for processing. For example, a client may request that optimizer 241 minimize workflow processing time, optimize workflow processing time or not consider processing time when generating an optimized service workflow. Similarly, a client may indicate that the size of the dataset to be processed by the optimized service workflow is large, medium or small and/or may indicate that the expected dollar cost of processing the service workflow should be minimized or optimized.

As further shown in FIG. 7, constraints table 730 may comprise a column identifying each of the one or more client-defined constraints, a column containing values associated with each of the one or more constraints, and a column containing a priority level associated with each of the one or more constraints. According to an embodiment of the present invention, a client may indicate a priority associated with each constraint included in constraints table 730. Accordingly, optimizer 241 may optimize service workflow 700 based on the associated priority levels indicated in constraints table 730. For example, optimizer 241 may identify that the DollarCostForProcessing constraint is associated with the highest priority parameter, e.g., priority value of 1 and, in response, initially optimize service workflow 700 to minimize the processing costs associated with performing the one or more software services included in service workflow 700. Based on the associated priority of the SizeOfDataset constraint, optimizer 241 may further optimize service workflow 700 by identifying service plans capable of performing the one or more services in workflow 700 on large data sets.

A diagrammatic illustration of an example catalogue 800 according to an embodiment of the present invention is illustrated in FIG. 8. By way of example, catalogue 800 may include a field listing all of the software services to which client device 120(N) is exposed and may further include a field identifying a catalogue type (e.g., data, API, etc.) associated with each of the software services included in catalogue 800 and a field providing a description of each of the software services included in catalogue 800. According to an embodiment, server 110 may store catalogue 800 in service plans database 370. By way of example, as shown in FIG. 8, the Twitter service may be a data-based service that retrieves published tweets. Similarly, a Detect Face service may be an API that provides facial recognition services, a Sentiment Analysis service may be an API that analyzes the sentiment of a data set, and a Facebook service may be a data-based service that provides personal data associated with the Facebook service. According to an embodiment, catalogue 800 may be associated with a vocabulary table that defines terms and/or entities used by one or more software services identified in catalogue 800. Accordingly, a vocabulary table may define one or more common vocabulary attributes that may be mapped to input attributes and/or output attributes associated with one or more service providers and used by one or more clients of one or more software services provided by the one or more service providers.

A diagrammatic illustration of an example service table 900 according to an embodiment of the present invention is illustrated in FIG. 9. As shown in FIG. 9, service table 900 may identify one or more services provided by one or more service providers and may include fields for Service ID, Catalogue ID, Service Name, Region, Service URL, API License Key, Open Authorization (OAuth) Key Details, Connector Jar and Priority. For example, the Service ID field may be associated with a particular service provider and may be mapped to a record in catalogue table 800 identified by the Catalogue ID field. According to an embodiment, server 110 may store service table 900 in service plans database 370. Similarly, the Service Name field may identify a software service associated with the Service ID field; the Region field may define a location where the software service is to be hosted, as each of the one or more software services may be hosted in different locations; the Service URL field may identify a uniform resource location (URL) associated with the software service, enabling optimizer 241 and/or one or more clients to access the software service; the API license key field may contain one or more API licensing keys, enabling optimizer 241 and/or one or more clients to access an API associated with the software service; the OAuth Key Details field may contain an OAuth license key, enabling optimizer 241 and/or one or more clients to access the software service; and the Connector Jar field may contain information associated with one or more service providers, enabling service provider connector to successfully connect to the one or more service providers. Finally, the Priority field may contain a client-defined preference associated with a service provider hosting the service identified by the Service ID field. For example, if a client has a preference for the service provider associated with the Service ID field to provide the software service, the client may set a higher priority for that service provider, vis-à-vis other service providers hosting the same or similar services. Accordingly, if optimizer 241 determines that two service plans offered by different service providers have the same estimated cost, optimizer will include the service plan having the higher priority value in an optimized service workflow recommended to the client.

A diagrammatic illustration of an example service plan 1000 according to an embodiment of the present invention is illustrated in FIG. 10. Service plan 1000 may be associated with a specific service provider and may identify one or more plan ranges (e.g., quantity of requests) and a cost associated with each of the one or more plan ranges. Each service provider may have one or more service plans associated with each of the software services that it provides. Therefore, the cost associated with a particular service is dependent on one or more service plans associated with the service. According to an embodiment, server 110 may store service plan 1000 in service plans database 370.

By way of example, service plan 1000 may identify three service plan ranges for a face detection service, in which the first 1000 requests are free, the requests up to the millionth request cost $1.50/1000 requests, and the requests up to the five millionth request cost $1.30/1000 requests. That is, a service provider may process a small number of requests per month for free to encourage clients to use their service, and subsequently offer differential rates that provide lower unit costs for higher rates of usage.

It should be understood that a service provider may have a plurality of different service plan ranges. For example, a service provider may offer differential rate service plans that may include: the first 10,000 requests are free and the cost per request is $0.004 thereafter; a flat fee of $150 for the first 50,000 requests, and a cost of $0.05/request exceeding the 50,000 limit; and/or a flat fee of $0.005 per request, regardless of how many requests are processed by the service provider. According to an embodiment, optimizer 241 may select multiple service plans, hosted by multiple service providers, that offer free and/or differential rate service ranges to satisfy, in aggregate, the client requirements for the software service to minimize the costs of one or more services included in a service workflow.

Accordingly, optimizer 241 may determine the costs associated with a range-based plan, such as that shown in FIG. 10, as: Range-Based(cost θ)=1+(Cost for new N processing requests—Cost for processing requests until now), where Cost for processing requests until now is an aggregate value of all prior service requests based on valid service plan information stored in the monthly cost table.

For example, using the monthly service plan information shown in FIG. 10, if a client made 3 million requests, a value for the parameter Cost Until Now may be determined as:

Costs Until Now=0 (for the first 1000 requests)+($1.5/1000 request until requests 1001-1,000,000)+($1.3/1000 requests for requests 1,000,001-3,000,000); or Costs Until Now=0+ $1498.5+$2600=$4098.5

According to an embodiment of the present invention, optimizer 241 may determine the number of free service plan ranges in a service plan table to select one or more software services included in an optimized service workflow by determining the value of a Free(cost θ) parameter, wherein Free(cost θ) parameter may be determined as: Free(cost θ)=[(No. of requests to be made)/(Total No. of free requests available in Service Plan Table)], where: 0≤Free (cost θ)≤1.

Accordingly, if the value of Free(cost θ) is close to 0 for a particular service, optimizer 241 may determine that many free requests for the software service remain unused and therefore optimizer 241 should continue to identify and include free service plan ranges in the optimized service workflow. Similarly, if the value of Free(cost θ) is close to 1 for a particular service, optimizer 241 may determine that few, if any, free request ranges for the service are available and therefore optimizer 241 should analyze the lowest cost differential plan ranges to minimize total aggregate cost associated with the software service.

Similarly, optimizer 241 may determine the total expected cost associated with a fixed-price plan over a pre-configured range of monthly transactions, i.e., a service plan having a constant price within the pre-configured range, based on the total amount of data to be processed. For example, optimizer 241 may determine that the expected costs associated with a fixed-price service plan as: Fixed Price (cost θ)=1+(Total Cost in Dollars)*[(No. of Calls to be Made)/(No. of Total Calls Available)]; wherein 1 may be added to ensure that Fixed Price (cost θ)>1 and is greater than Free(cost θ).

Figure 11A:
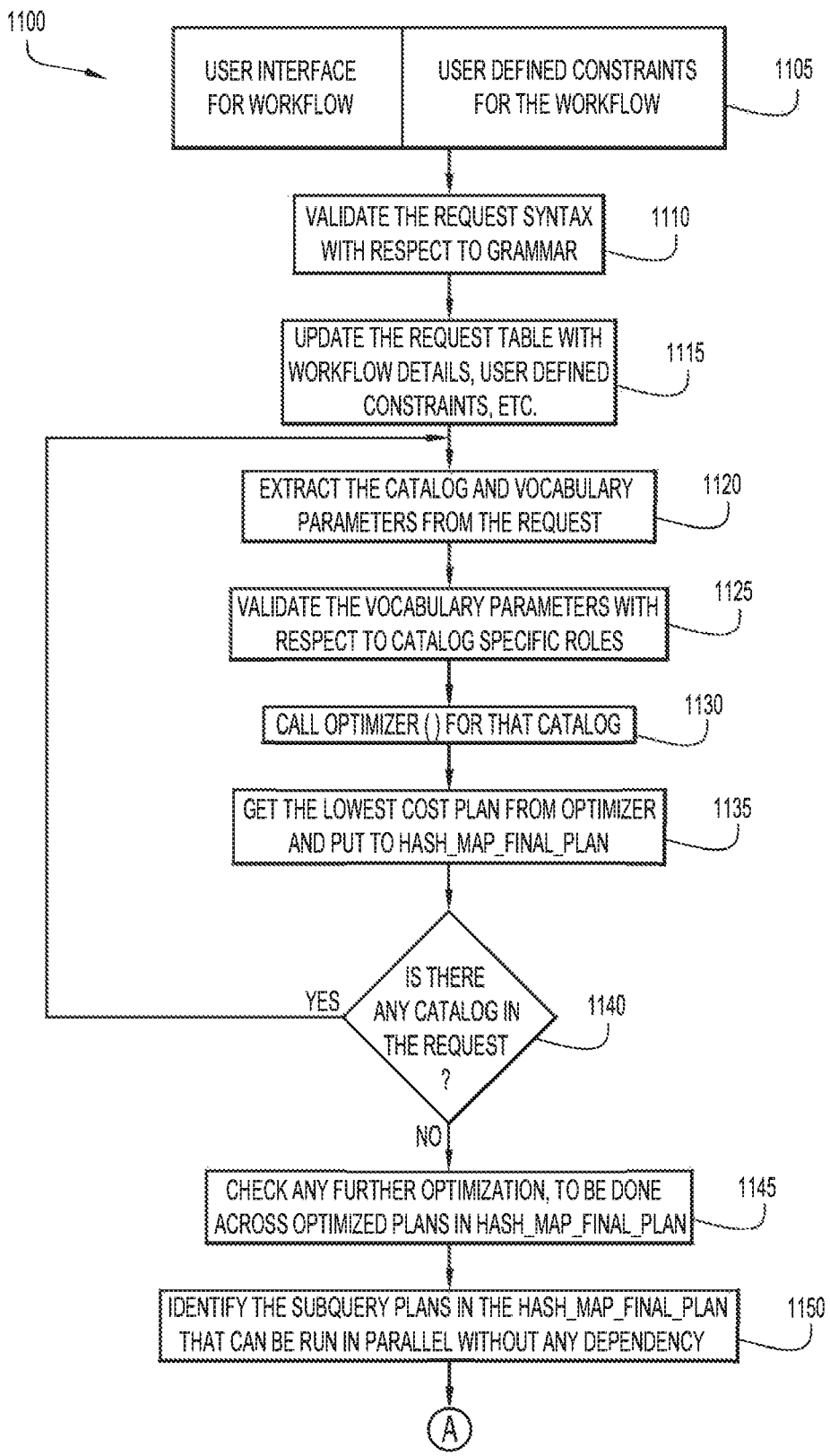
FIGS. 11A-11B are a procedural flow chart illustrating a manner of determining an optimized workflow, according to an embodiment of the present invention.
Figure 11B:
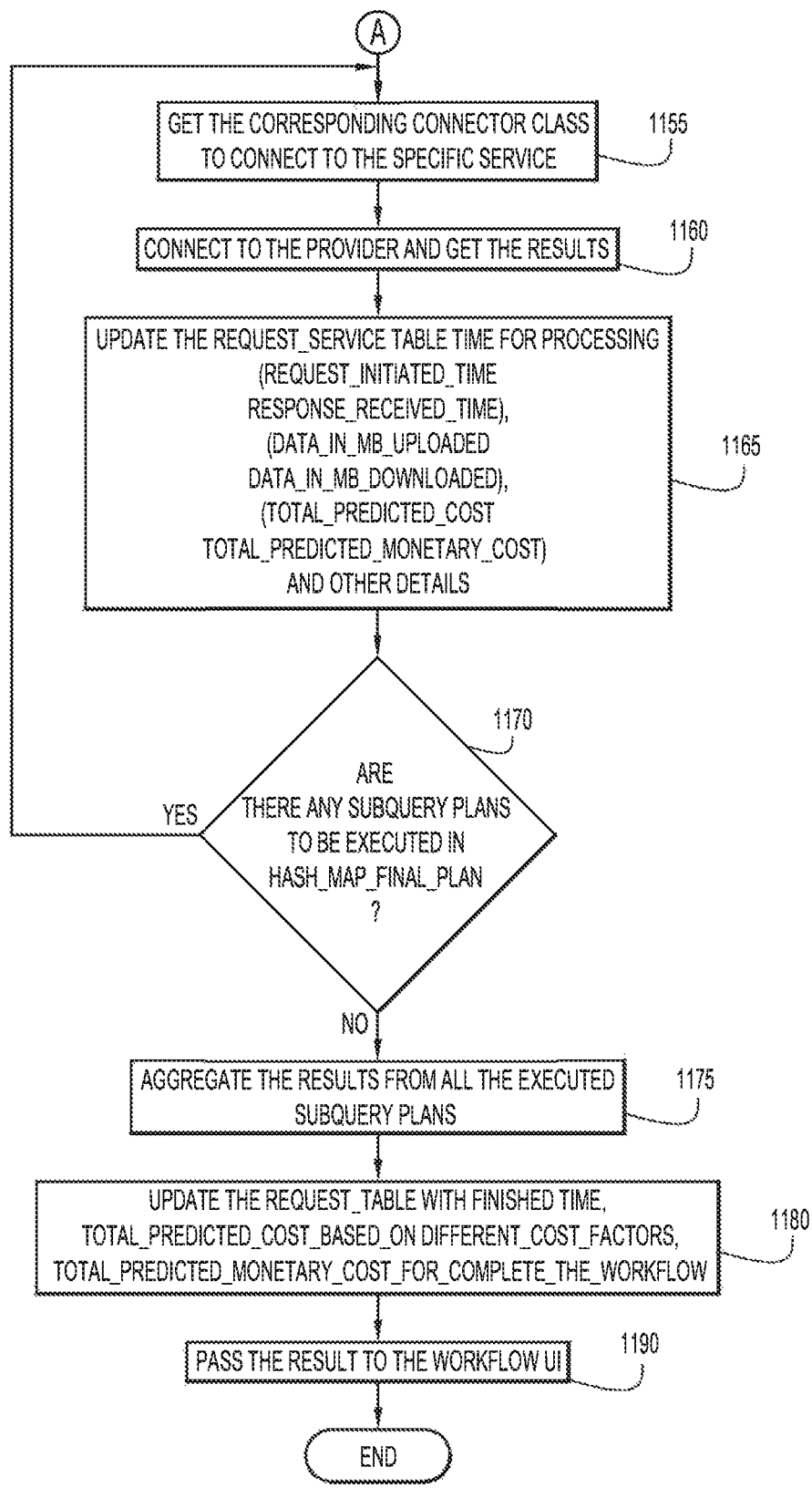

With reference to FIGS. 11a-11b, there is depicted a procedural flow chart illustrating a method 1100 in which an optimized service workflow is determined. Method 1100 is performed primarily by optimizer 241.

Initially, server 110 receives, via workflow interface 340, a request to optimize a service workflow including workflow information and client-defined constraints associated with the service workflow at step 1105. In response, workflow analyzer 242 analyzes the incoming request (e.g., using Natural Language Processing (NLP) techniques, parsers, etc.) to validate the syntax of the request with respect to grammar at step 1110. A request table that includes the service workflow information and the client-defined constraints is updated to include the request to optimize the service workflow at step 1115.

Workflow analyzer 242 may extract a service catalogue, included one or more software services, as well as one or more vocabulary parameters from the optimization request (e.g., by using NLP techniques, parsers, etc.) at step 1120.

Workflow analyzer 242 may validate one or more vocabulary parameters included in the service catalogue with respect to specific software services and/or roles at step 1125. According to an embodiment of the present invention, workflow analyzer 242 may validate the one or more vocabulary parameters by cross-referencing the one or more vocabulary parameters with one or more records in one or more vocabulary tables associated with one or more service providers corresponding to the specific software services and/or roles included in the extracted service catalogue.

Optimizer 241 optimizes the one or more software services included in the extracted catalogue at step 1130, and stores the lowest cost plan returned by the optimization routine in an optimized plan table at step 1135.

At step 1140, a determination is made whether the optimization request includes further service catalogues, and if so, operations return to step 1120 to extract and validate one or more vocabulary parameters included in the service catalogue.

If the optimization request does not include any further service catalogues, a determination is made whether any further optimizations may be made across one or more optimized plans included in the optimized plan table at step 1145. According to an embodiment, optimizer 241 may analyze free and differential plan ranges included in one or more service plans to determine whether further optimizations may be made by dividing the processing of one or more software services across the one or more service plans.

A determination is made whether multiple subquery service plans included in the optimized plan table may be simultaneously executed, i.e., run in parallel, to further optimize costs and processing time at step 1150. According to an embodiment, based on client-defined constraints and service workflow information, optimizer 241 may split a service workflow into separate subqueries, which optimizer 241 may forward to different service providers for execution or to retrieve service plan information associated with subqueries. For example, optimizer 241 may determine that a contextual analysis service may analyze Twitter feeds contemporaneously with a facial recognition service processing Facebook images, thereby reducing aggregate processing times. According to a further embodiment, the request service table may store cost and other details associated with each subquery.

The connector information, e.g., connector class, associated with a specific software service included in the optimized service plan table is retrieved at step 1155, enabling service provider connector 360 to connect to one or more service providers to request service information including estimated costs and processing times at step 1160.

The optimized service plan table is updated to include the service information and total costs associated with the software service at step 1165. According to an embodiment, the optimized service plan table is updated to include a request initiated time and a response received time associated with the service information request, an amount of data to be uploaded and/or downloaded to the service provider, and total predicted dollar and total predicted service costs. According to a further embodiment, a client may indicate that optimizer 241 should consider the opportunity cost associated with workflow calls to one or more service providers when determining the total cost associated with a service workflow. Accordingly, the total predicted service costs associated with a service workflow may be determined as: Total Predicted Service Cost=f (Total Dollar Cost, Provider Processing Time Cost, Opportunity Cost, Client-defined Constraint Cost).

At step 1170, a determination is made whether there are any subquery plans that have not been executed, and if so, operations return to step 1155 to get the connector information associated with one or more software providers associated with the subquery plan.

If there are no remaining subquery plans to be executed, the predicted costs of each of the subquery plans and results from each subquery are aggregated at step 1175.

The request table is updated to include the costs associated with the optimized service workflow at step 1180. According to an embodiment, the request table may be updated to include a predicted finishing time to execute the service workflow, a total predicted dollar cost associated with executing the service workflow and/or a total predicted cost for executing the service workflow based on estimated dollar costs, processing time and usage information.

The optimized service workflow executed t to process data within the specified performance and cost requirements and the final results of the executed service workflow are sent to the client, and method 1100 ends.

Figure 12:
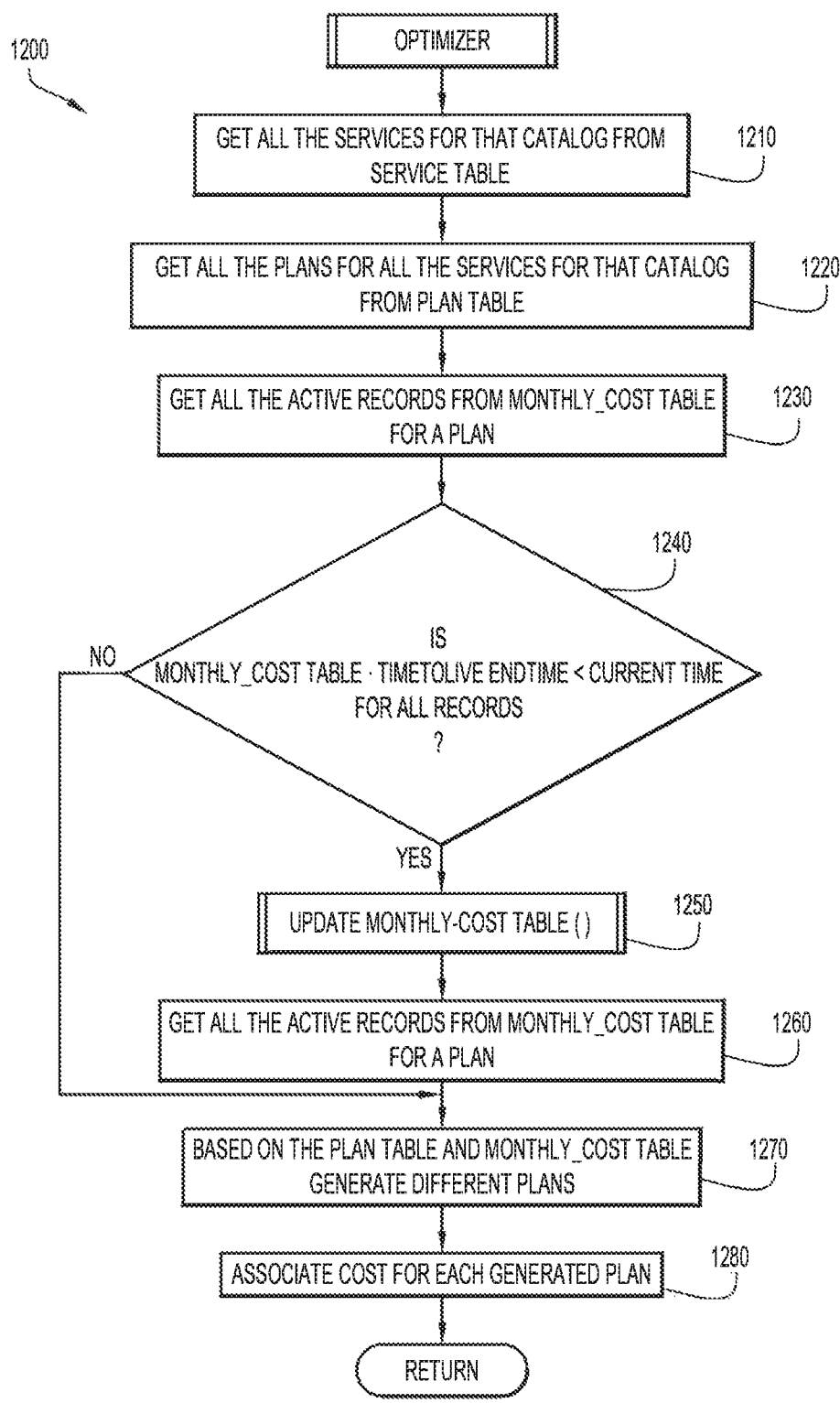
FIG. 12 is a procedural flow chart illustrating a manner of determining candidate plans for a workflow according to an embodiment of the present invention.

With reference to FIG. 12, there is depicted a procedural flow chart illustrating a method 1200 illustrating a manner of determining candidate plans for a workflow according to a present embodiment. Method 1200 is performed primarily by optimizer 241.

Initially, each of the software services of the optimization request and included in a specific service catalogue are retrieved at step 1210.

Each service plan associated with each of the services included in the service catalogue is identified from service plans database 370 at step 1220.

Updated monthly cost information associated with each service plan is retrieved from one or more active records in a monthly cost table associated with the service plan at step 1230. According to an embodiment of the present invention, a monthly cost table contains service plan information associated with different service plans related to a specific software service for each month, based on the validity of each service plan. According to a further embodiment of the present invention, a determination of validity may be based on any given interval (e.g., monthly, hourly, daily, etc.). Accordingly, optimizer 241 may use the service plan information stored in the monthly cost table to generate different service workflow recommendations and an expected cost associated with each of the service workflow recommendations.

At step 1240, a determination is made whether any of the cost records associated with the service plan have expired, and if so, operations proceed to step 1270 where service plans to be included in the optimized service workflow are generated, excluding expired service plans. According to an embodiment, a record in a monthly cost table has expired if a time-to-live-end-time parameter indicates a time prior to the current time of the optimization process.

If any of the cost records associated with the service plan has expired, a monthly cost table associated with the service plan is updated to include the updated monthly cost information at step 1250.

Each of the active records for a service plan are retrieved from the updated monthly cost table associated with the service plan at step 1260.

Based on the service plan table and the updated monthly cost table, different service plans to be included in an optimized service workflow are generated at step 1270.

The total cost associated with each of the service plans included in the optimized service workflow is determined at step 1280, and method 1200 ends.

Figure 13:
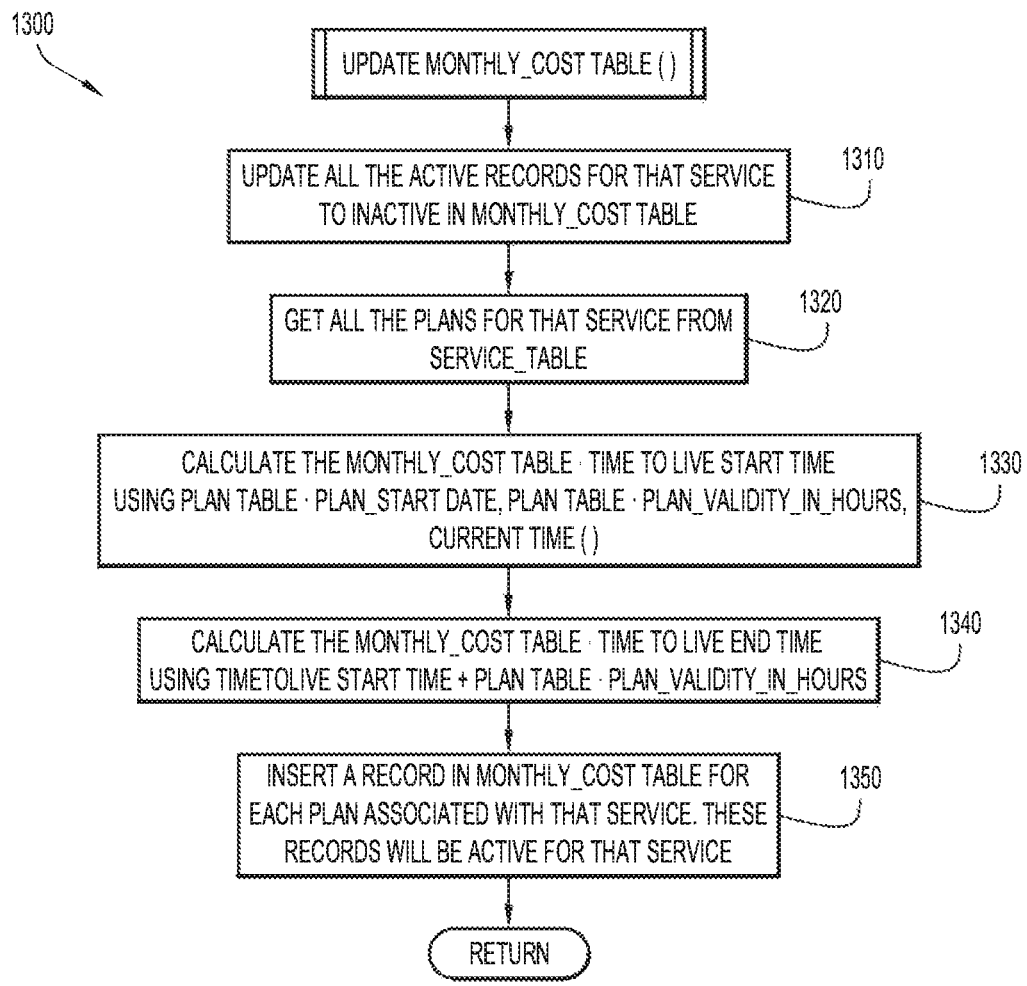
FIG. 13 is a procedural flow chart illustrating a manner in which monthly costs associated with one or more service plans are updated according to an embodiment of the present invention.

With reference to FIG. 13, there is depicted a procedural flow chart illustrating a method 1300 in which monthly costs associated with a service plan are updated according to a present invention embodiment.

Initially, each of active records associated with a software service is updated to become inactive in a monthly cost table associated with the software service at step 1310.

Each service plan associated with the software service is identified from the service plan table at step 1320.

For each service plan associated with the software service, the time before the service plan begins is determined, i.e., a time-to-live start-time associated with the service plan, at step 1330. According to an embodiment, the time-to-live associated with the start time may be dependent on the service plan start date, the service plan validity period (in hours) and the current time associated with method 1300.

For each service plan associated with the software service, the time before the service plan ends is also determined, i.e., a time-to-live end-time associated with the service plan, at step 1340. According to an embodiment, the time-to-live end-time may be determined as: Time-to-Live End-Time=Time-to-Live Start-Time+Plan Validity (in hours)

For each service plan associated with the software service, a monthly cost table associated with the service plan is updated to include a record comprising the time-to-live start-time and time-to-live end-time values at step 1350, and method 1300 ends. According to an embodiment, the records inserted into the monthly cost table are active.

Figure 14:
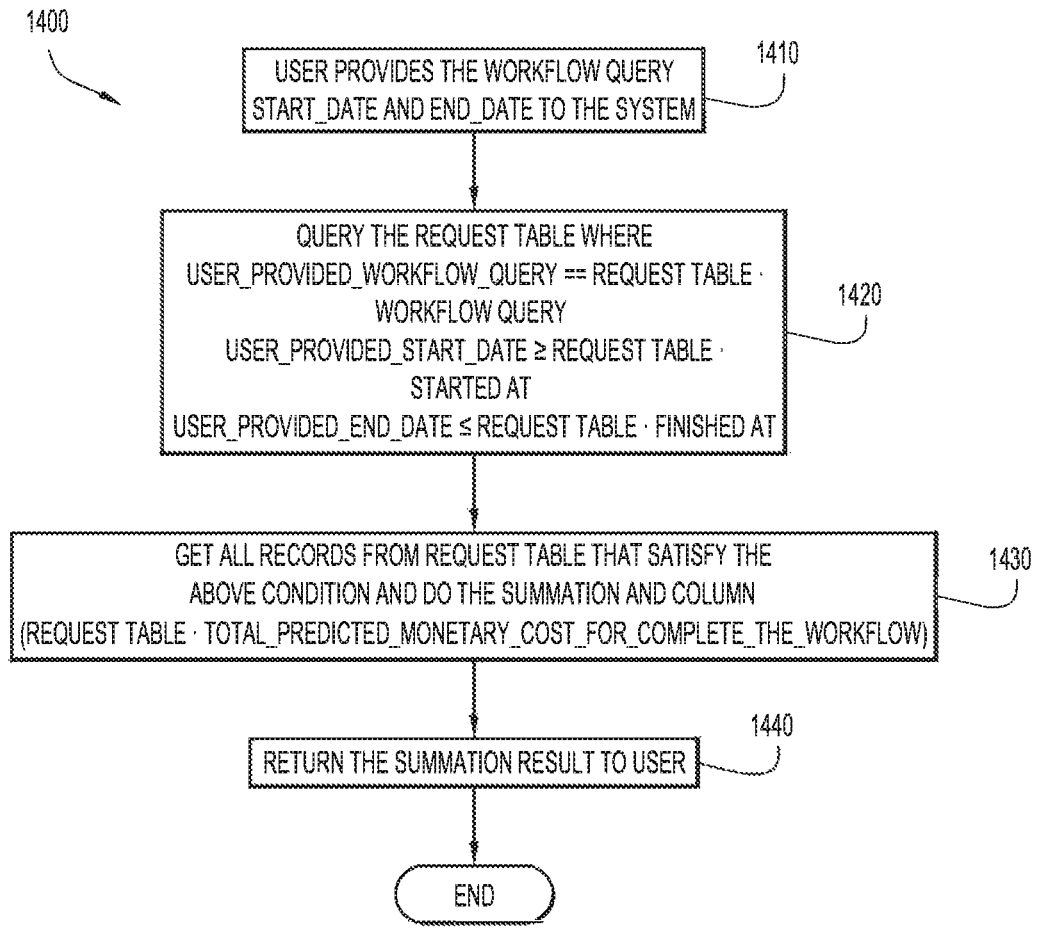
FIG. 14 is a procedural flow chart illustrating a manner in which an estimated aggregate cost associated with a client workflow query is determined according to an embodiment of the present invention.

With reference to FIG. 14, there is depicted a procedural flow chart illustrating method 1400 in which an estimated aggregate cost associated with a service workflow query is determined according to a present embodiment. Specifically, FIG. 14 illustrates a manner in which analytic data is generated concerning client usage of one or more services hosted by one or more service providers during a billing interval. For example, method 1400 may generate information concerning the amount a client company spent for their particular business operations and/or to execute one or more service workflows during the previous month. According to an embodiment of the present invention, a client using the optimization services of optimizer 241 may be billed based on the number of service workflow queries that the client uploads to optimizer 241 during a billing interval, e.g., monthly. Accordingly, estimating an aggregate cost associated with one or more service workflow queries may enable a client to more accurately estimate a service bill associated with the one or more service workflow queries over the interval period.

Initially, a client provides a service start date and a service end date associated with a service workflow query at step 1410.

The workflow query, the service start date, and the service end date are retrieved from a request table associated with the workflow query at step 1420.

The costs associated with each service plan in the request table that is valid during the period between the service start date and the service end date is retrieved and aggregated to determine a total predicted cost for completing the service workflow at step 1430.

The aggregated total predicted costs is returned to the client at step 1440, and method 1400 ends.

Figure 15:
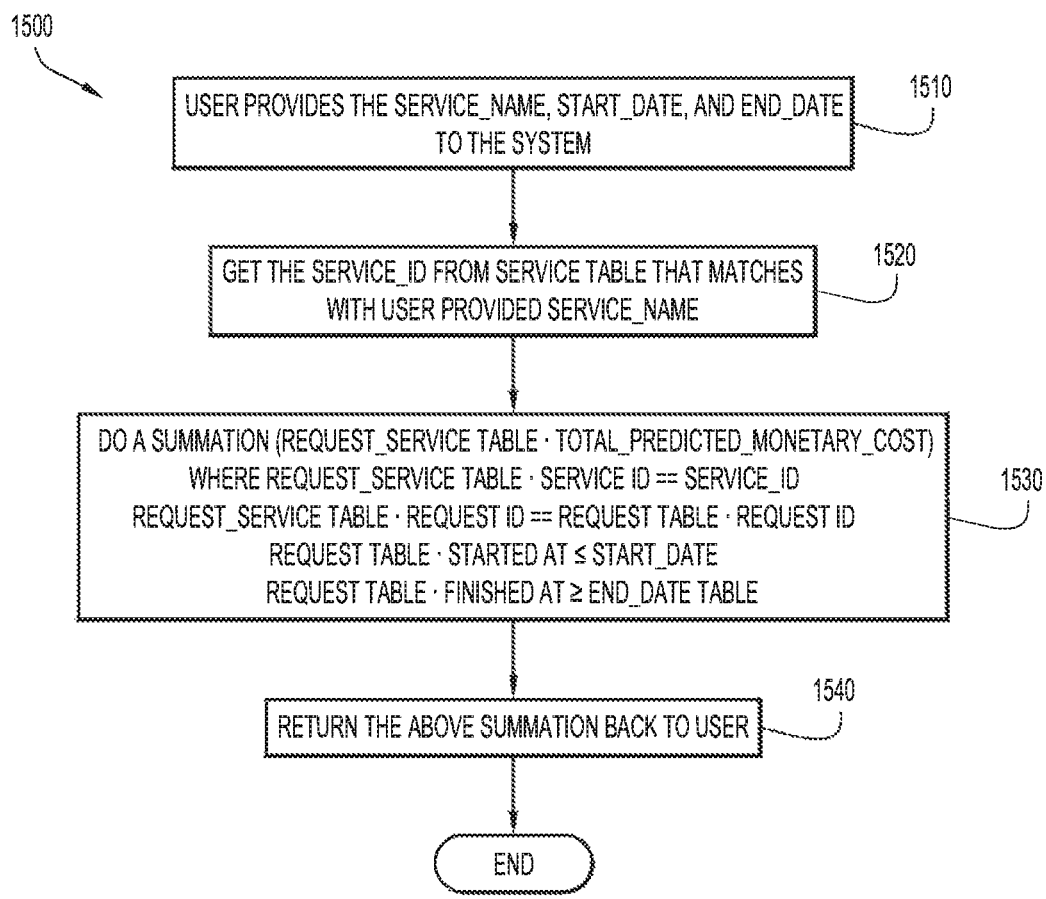
FIG. 15 is a procedural flow chart illustrating a manner in which an estimated aggregate cost associated with a service plan is determined according to an embodiment of the present invention.

With reference to FIG. 15, there is depicted a procedural flow chart illustrating a method 1500 in which an estimated aggregate cost associated with a service plan is determined according to a present embodiment. Specifically, FIG. 15 illustrates a manner in which analytic data is generated concerning client usage of one or more services hosted by a particular service provider during a billing period, e.g., the previous month.

Initially, a client provides a software service name, a service start date and a service end date associated with the software service at step 1510.

The service ID corresponding to the software service name provided by the client is retrieved from a service table associated with the software service at step 1520.

The costs associated with each service in the service table that is valid during the period between the service start date and the service end date is retrieved and aggregated to determine a total predicted cost associated with the service at step 1530.

The aggregated total predicted costs is returned to the client at step 1540, and method 1500 ends.

Figure 16:
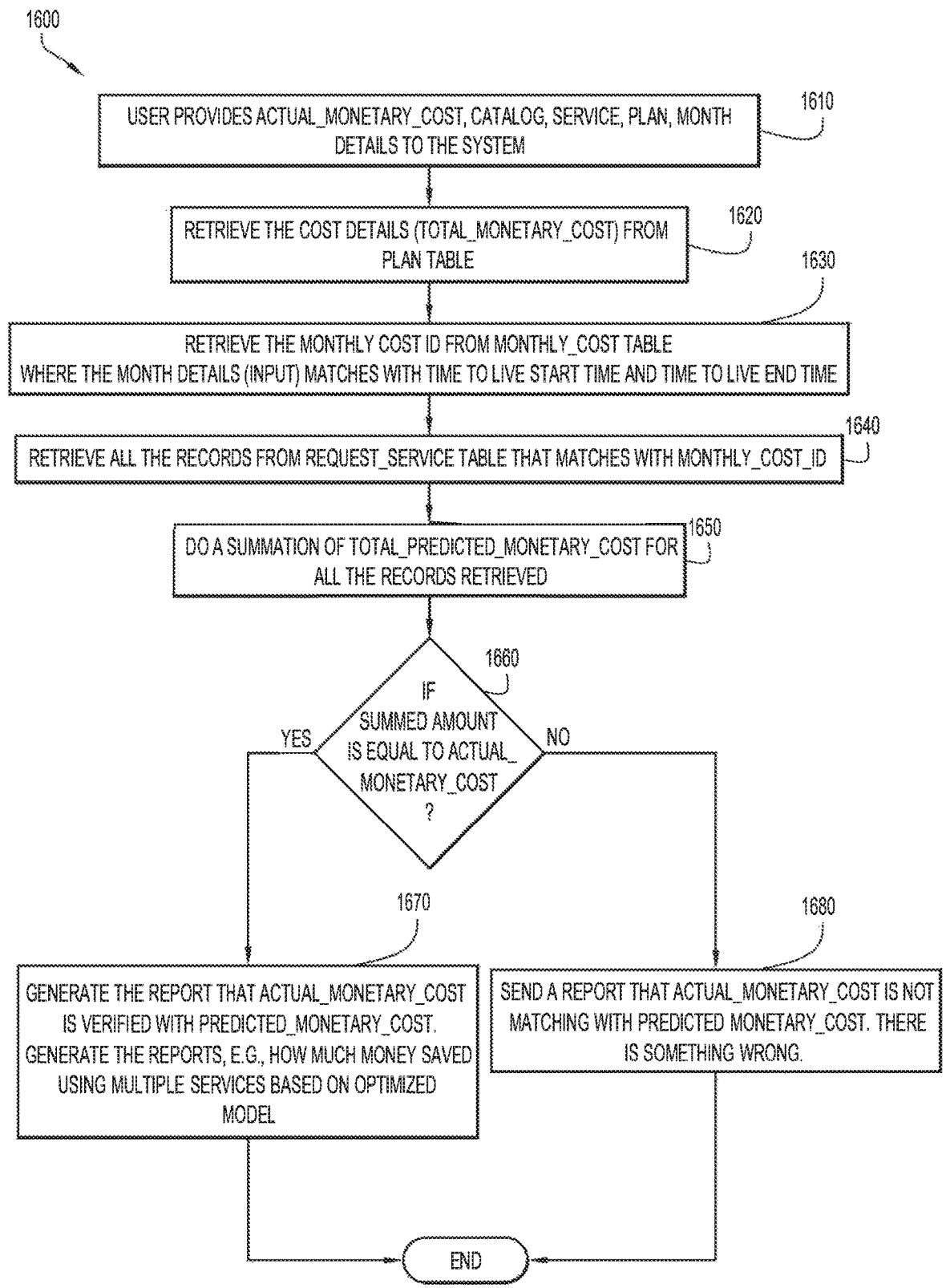
FIG. 16 is a procedural flow chart illustrating a manner in which monthly costs associated with a service plan are verified according to an embodiment of the present invention.

With reference to FIG. 16, there is depicted a procedural flow chart illustrating a method 1600 in which monthly costs associated with a service plan are verified according to a present embodiment. Each of the one or more service providers hosting the one or more software services included in an optimized service workflow may independently bill a client for the software services service used by the client. According to an embodiment of the present invention, therefore, optimizer 241 may determine the expected monthly cost associated with executing one or more optimized service workflows, enabling a client to determine whether any billing discrepancies exist between the actual amount billed by the one or more service providers and the estimated monthly costs determined by optimizer 241.

Initially, a client provides information associated with a software service at step 1610. According to an embodiment, the information associated with the software service may include the actual costs billed to the client for executing the software service, a service catalogue identifying one or more service plans associated with the software service, a service ID associated with the service, information associated with the one or more service plans included in the service catalogue, and monthly details associated with the execution of the software service. According to a further embodiment, the monthly details associated with the execution of the software service include a start time for the software service and an end time for the software service.

Cost information for each service plan associated with the software service is retrieved from the service plan table at step 1620.

The monthly costs associated with each service plan that is valid during the period defined by the monthly start time and the monthly end time are retrieved from the monthly cost table at step 1630.

Each cost record associated with a service plan that matches the service ID in the monthly cost table is retrieved from the request service table at step 1640, and aggregated to determine a total predicted cost associated with the software service at step 1650.

If it is determined that the total predicted cost equals the actual cost billed to the client at step 1660, a report may be generated and sent to client indicating that the actual cost billed to the client was verified with the predicted cost associated with the service at step 1670, and method 1600 ends. According to an embodiment, the generated report may include a statement including the total amount the client saved by using an optimized service plan.

If it is determined that the total predicted cost does not equals the actual cost billed to the client, a report may be generated and sent to client indicating that something is wrong because the actual cost billed to the client does not match the predicted cost associated with the service at step 1680, and method 1600 ends.

Figure 17:
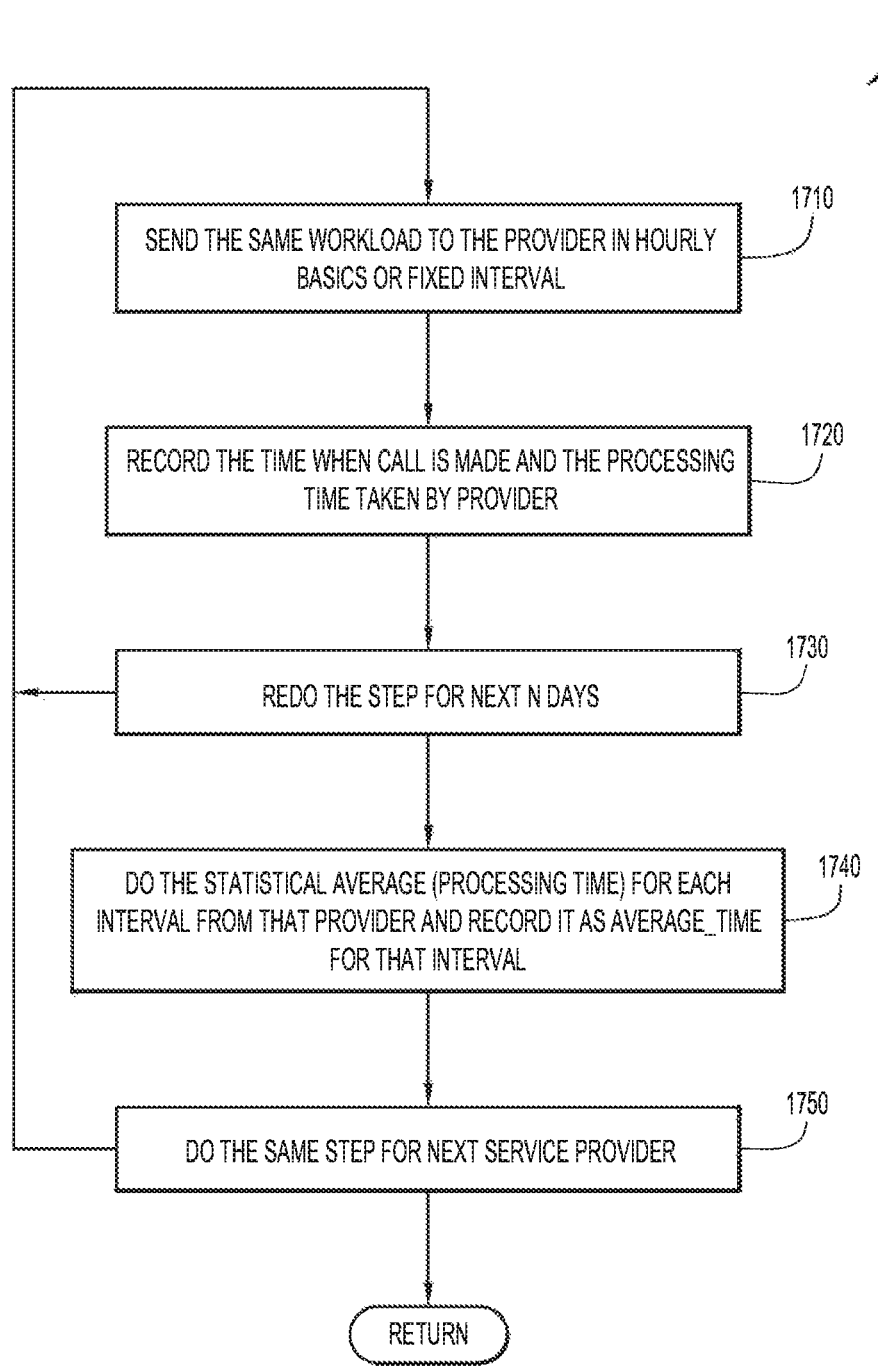
FIG. 17 is a procedural flow chart illustrating a manner in which processing time associated with one or more service providers is determined according to an embodiment of the present invention.

With reference to FIG. 17, there is depicted a procedural flow chart illustrating a method 1700 in which processing time associated with one or more service providers is determined according to a present embodiment. Method 1700 is performed primarily by optimizer 241. According to an embodiment of the present invention, a client may assign a high priority level to minimizing the processing time associated with an optimized service workflow. Accordingly, to optimize a service workflow, it may be necessary for optimizer 241 to accurately estimate the processing times associated with each of the one or more service providers executing the one or more software services included in the optimized service workflow.

Initially, service workflow information is uploaded to a service provider at step 1710. According to an embodiment, the service workflow information may be uploaded in hourly increments or at pre-configured fixed intervals.

The time when the service workflow information is uploaded and the time taken by the service provider to process the service workflow are recorded at step 1710.

A determination is made, at step 1730, whether the processing times have been recorded for fewer than a pre-configured number of days, e.g., N, and if so, operations return to step 1710 where service workflow information is uploaded to the service provider.

If the processing times have been recorded for the pre-configured number of days, a statistical average of the processing time is determined for each time interval and the average time for that time interval is recorded at step 1740. According to an embodiment, the optimal time to upload service workflow information to the service provider is determined as being the time interval having the lowest associated average processing time.

A determination is made, at step 1750, whether the average processing time has been determined for each service provider, and if not, operations return to step 1710 where service workflow information is uploaded to a different service provider.

If the average processing time has been determined for each service provider, method 1700 ends.

Figure 18:
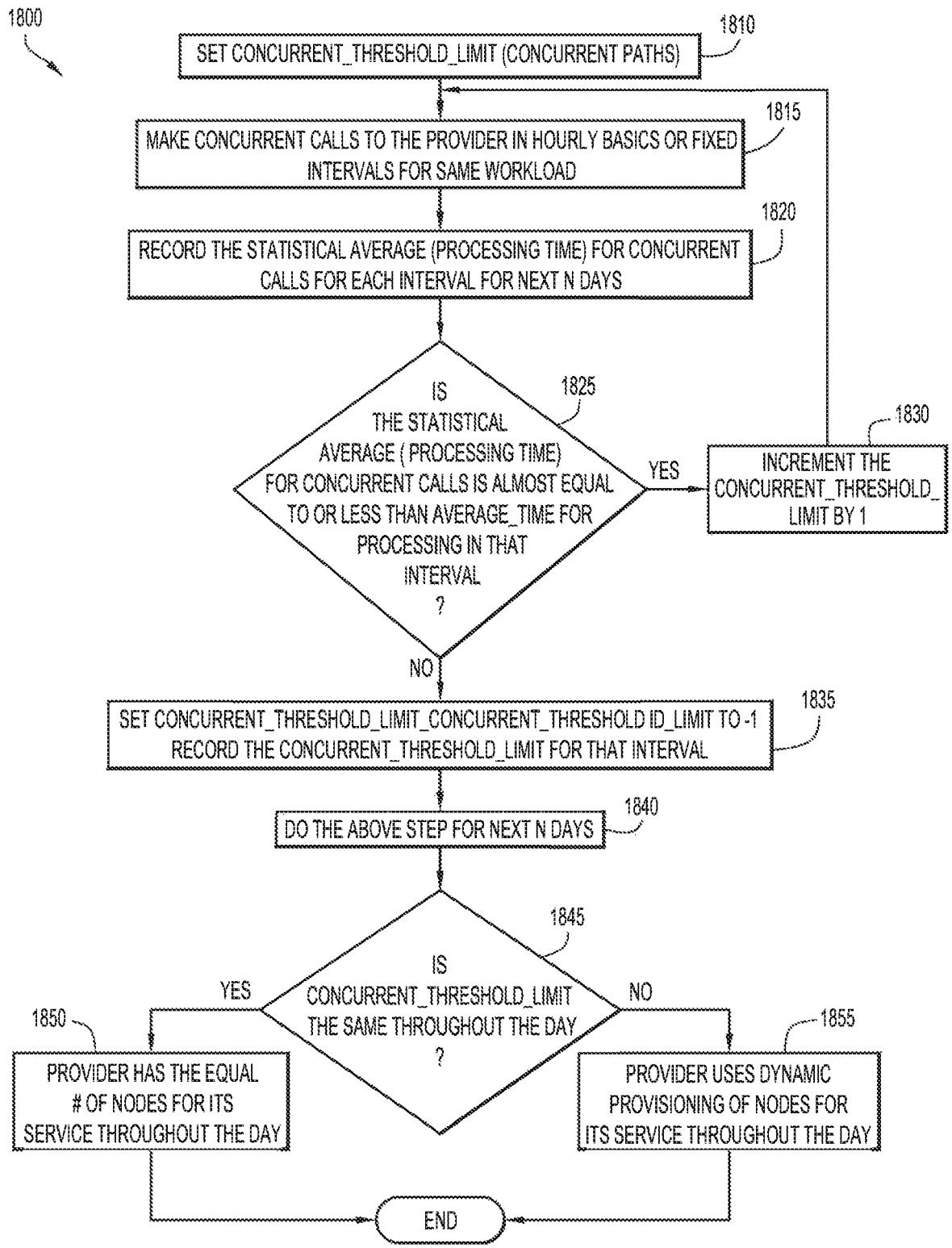
FIG. 18 is a procedural flow chart illustrating a manner in which a concurrent processing limit associated with one or more service providers is determined according to an embodiment of the present invention.

With reference to FIG. 18, there is depicted a procedural flow chart illustrating a method 1800 in which a concurrent processing limit associated with a service provider is determined according to a present embodiment. Method 1800 is performed primarily by optimizer 241. As discussed above, a client may assign a high priority level to minimizing the processing time associated with an optimized service workflow. According to a further embodiment of the present invention, optimizer 241 may further optimize a service workflow by determining whether concurrent service calls may be made in parallel to minimize overall processing time. Accordingly, to optimize a service workflow, it may be necessary for optimizer 241 to accurately estimate the processing times associated with each of the one or more service providers executing one or more concurrent processing requests.

Initially, a concurrent processing threshold limit associated with a service provider is set at step 1810. According to an embodiment of the present invention, the concurrent processing threshold limit may be initially set to a pre-determined average value for the concurrent processing times associated with the service provider.

Concurrent processing calls are made to the service provider at step 1815. According to an embodiment, the concurrent processing calls may be made in hourly increments or at pre-configured fixed intervals.

A statistical average of the processing time for the concurrent calls is determined for each time interval over a pre-configured number of days and the average time for each time interval is recorded at step 1820.

At step 1825, a determination is made whether the statistical average of the processing time for the concurrent calls is almost equal to a previously determined value associated with the service provider for processing concurrent calls in that time interval, and if so, the concurrent threshold limit is incremented by 1 at step 1830, and operations return to step 1815 where concurrent processing calls are made to the service provider.

If the statistical average of the processing time for the concurrent calls is not almost equal to a previously determined value associated with the service provider for processing concurrent calls in that time interval, the concurrent threshold limit associated with the service provider is set to −1 and the concurrent threshold limit for that interval is recorded at step 1835.

A determination is made, at step 1840, whether the concurrent threshold limit has been determined for fewer than a pre-configured number of days, e.g., N, and if so, operations return to step 1815 where concurrent processing calls are made to the service provider.

If the concurrent threshold limit has been determined for a pre-configured number of days, a determination is made whether the concurrent processing limit is constant throughout the day at step 1845.

If the concurrent processing limit is constant throughout the day, a determination is made that the service provider may maintain a constant number of processing nodes throughout the day at step 1850, and method 1800 ends.

If the concurrent processing limit is not constant throughout the day, a determination is made that the service provider should employ a dynamic provisioning of service nodes based on the concurrent processing limit for each interval throughout the day at step 1855, and method 1800 ends.

Advantages of the present invention embodiments include dynamically optimizing one or more service workflows received from one or more clients by determining an optimum selection of one or more service providers, and associated service plans, that satisfy the processing requirements and costs constraints of the one or more clients and automatically connecting with each of the one or more selected service providers to execute the one or more optimized service workflows. The system may further optimize the one or more service workflows by determining the optimum time to connect to each of the one or more service providers and whether concurrent processing of one or more of software services hosted by the one or more service providers may further reduce the overall processing time needed to execute the one or more service workflows. Furthermore, the system may also estimate the expected costs associated with executing the one or more optimized service workflows and compare the expected costs with the actual costs received from each of the one or more service providers to determine whether any billing discrepancies have occurred.

It will be appreciated that the embodiments described above and illustrated in the drawings represent only a few of the many ways of implementing embodiments for optimization of a workflow employing software services.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., optimizer, workflow interface, workflow analyzer, service provider connector, etc.). These systems may include any types of monitors and input devices (e.g., keyboard, mouse, voice recognition, etc.) to enter and/or view information.

It is to be understood that the software (e.g., optimizer, workflow interface, workflow analyzer, service provider connector, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., optimizer, workflow interface, workflow analyzer, service provider connector, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store service workflow information, service plan information and one or more client-defined constraints (e.g., dollar cost, opportunity cost, processing time, size of dataset, etc.). The database system may be implemented by any number of any conventional or other databases, data stores or storage structures (e.g., files, databases, data structures, data or other repositories, etc.) to store information (e.g., service workflow information, service plan information, one or more client-defined constraints, etc.). The database system may be included within or coupled to the server and/or client systems. The database systems and/or storage structures may be remote from or local to the computer or other processing systems, and may store any desired data (e.g., service workflow information, service plan information, one or more client-defined constraints, etc.).

The present invention embodiments may employ any number of any type of user interface (e.g., Graphical User Interface (GUI), command-line, prompt, etc.) for obtaining or providing information (e.g., messages, analytics, configurations, client constraints, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a client (e.g., optimized service workflow recommendations, service plan information, etc.).

The present invention embodiments are not limited to the specific tasks or algorithms described above, but may be utilized for any type of service workflow processing (e.g., contextual analysis, facial recognition, sentiment analysis, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically optimizing a plurality of workflows including a plurality of cloud-based software services, the method performed by a cloud-based server comprising at least one processor and a memory coupled to the at least one processor, the method comprising:
   receiving a request to optimize the plurality of workflows wherein the request includes one or more service requirements and one or more performance objectives related to the one or more service requirements;
   validating service plan information associated with a plurality of software service plans pre-arranged with one or more service providers, wherein the software service plans indicate a plurality of ranges for service requests with each range associated with a quantity range for service requests and a corresponding cost for service requests within that quantity range;
   generating a plurality of candidate workflows based on the service requirements and performance objectives, wherein each candidate workflow includes one or more software services with validated service plan information;
   determining optimized workflows from the candidate workflows based on minimizing processing time of the optimized workflows and a cost of the one or more software services within the candidate workflows determined in accordance with the software service plans, wherein the ranges of the software service plans are selectively considered based on a parameter indicating a quantity of service requests to be made relative to a quantity of available service requests remaining for the ranges;
   determining an optimum time to connect to each of the one or more service providers;
   determining, based on the determining the optimum time, that concurrent processing of two or more software services hosted by the one or more service providers reduces processing time needed to execute the plurality of workflows;
   automatically connecting, at the optimum time, one or more client devices to the one or more service providers and concurrently processing the two or more software services hosted by the one or more service providers;
   executing the optimized workflows by the connecting to the one or more service providers of the software services of the optimized workflows to perform operations of the software services of the optimized workflows; and
   periodically analyzing information pertaining to performance of the optimized workflows over an interval period from the one or more service providers of the software services of the optimized workflows, and dynamically updating one or more of the software service plans based on the analysis.

2. The method of claim 1, wherein generating the plurality of candidate workflows comprises:
   generating a minimum-cost prediction for each validated software service;
   for each of the one or more service providers, identifying a minimum-cost service plan for each validated software service; and
      determining the lowest minimum-cost service plan for each validated software service that satisfies the service requirements and performance objectives.

3. The method of claim 1, wherein the cost of the one or more software services within the candidate workflows includes a monetary cost associated with the one or more software services and a time processing cost associated with the one or more software services.

4. The method of claim 3, wherein the cost of the one or more software services within the candidate workflows further includes an opportunity cost associated with executing the one or more software services and one or more constraints defined by a user associated with the request to optimize the plurality of workflows.

5. The method of claim 1, wherein determining optimized workflows further comprises:
   for each of the plurality of candidate workflows, determining whether a cost associated with a software service included in the candidate workflow may be reduced by selecting the same service provider to simultaneously provide the software service and at least one other software service in the candidate workflow; and
   aggregating the cost associated with each software service included in the candidate workflow.

6. The method of claim 1, wherein determining optimized workflows further comprises:
   reducing a minimum cost prediction of a software service by selecting a first service provider to provide a first portion of the software service and at least a second service provider to provide at least a second portion of the software service.

7. The method of claim 1, wherein validating the service plan information further comprises:
   extracting one or more vocabulary parameters associated with the request;
   identifying at least one service plan offered by the one or more service providers based on the one or more vocabulary parameters; and
   determining that at least one service plan offered by the one or more service providers has not expired.

8. The method of claim 1, wherein determining optimized workflows further comprises determining an optimal time to upload information associated with the workflows to each of the one or more service providers based on an average processing time for each of the one or more service providers over a plurality of pre-configured time intervals.

9. The method of claim 1, wherein determining optimized workflows further comprises determining an optimal time to execute concurrently a plurality of the one or more software services based on an average processing time for each of the one or more service providers to concurrently execute the plurality of the one or more software services.

10. The method of claim 1, wherein the optimized workflows are determined from the candidate workflows based on the cost of the one or more software services executed during a service interval.

11. The method of claim 1, wherein validating service plan information further comprises:
    determining a quota associated with a user for the software service for each of the one or more service providers;
    determining a total quota amount for the user by aggregating the quota associated with each of the one or more service providers; and
    validating the request to optimize the plurality of workflows in response to an amount of software service requested by the user being less than or equal to the total quota amount for the user.

12. The method of claim 1, wherein determining optimized workflows from the candidate workflows further comprises sending a message recommending the optimized workflows or one or more service providers associated with the optimized workflows to a user associated with the request to optimize the plurality of workflows.

* * * * *